US012319556B2

(12) United States Patent
Venkatakrishnan et al.

(10) Patent No.: US 12,319,556 B2
(45) Date of Patent: Jun. 3, 2025

(54) AUTOMATED DISPENSING SYSTEM FOR CUSTOMIZED BEVERAGES

(71) Applicant: Starbucks Corporation, Seattle, WA (US)

(72) Inventors: Natarajan Venkatakrishnan, Bellevue, WA (US); Andrew Corlett, Issaquah, WA (US); Jonathan Levey, Kirkland, WA (US); Brandon Michael Roberts, Snohomish, WA (US)

(73) Assignee: Starbucks Corporation, Seattle, WA (US)

( * ) Notice: Subject to any disclaimer, the term of this patent is extended or adjusted under 35 U.S.C. 154(b) by 0 days.

(21) Appl. No.: 17/938,167

(22) Filed: Oct. 5, 2022

(65) Prior Publication Data

US 2023/0021411 A1    Jan. 26, 2023

Related U.S. Application Data

(60) Division of application No. 17/837,999, filed on Jun. 10, 2022, now Pat. No. 11,535,504, which is a (Continued)

(51) Int. Cl.
*B67D 1/00* (2006.01)
*B67D 1/08* (2006.01)
(Continued)

(52) U.S. Cl.
CPC ......... *B67D 1/0037* (2013.01); *B67D 1/0078* (2013.01); *B67D 1/0882* (2013.01);
(Continued)

(58) Field of Classification Search
CPC .. B67D 1/0037; B67D 1/0078; B67D 1/0882; B67D 1/0888; B67D 1/10
See application file for complete search history.

(56) References Cited

U.S. PATENT DOCUMENTS

| | | |
|---|---|---|
| 5,255,819 A | 1/1993 | Peckels |
| 5,603,430 A | 2/1997 | Loehrke et al. |

(Continued)

FOREIGN PATENT DOCUMENTS

| | | | |
|---|---|---|---|
| CA | 2940409 A1 * | 11/2015 | ........... B67D 1/0007 |
| CN | 109700318 | 5/2019 | |

(Continued)

OTHER PUBLICATIONS

Anonymous, "National Restaurant Association Show® Kicks off Saturday in Chicago"; National Restaurant Association Show; https://www.nationalrestaurantshow.com/national-restaurant-association-showr-kicks-saturday-chicago, dated May 20, 2022.

(Continued)

*Primary Examiner* — Jeremy Carroll
(74) *Attorney, Agent, or Firm* — Knobbe, Martens, Olson & Bear, LLP

(57) ABSTRACT

The disclosure generally relates to an automated modular dispensing platform for creating customized beverages (e.g., using various sauces, syrups, sweeteners, colors and/or flavors added to a base beverage). The automated dispensing platform may simultaneously aggregate beverage modifiers or ingredients (e.g., sweetener, flavor, and/or color) and facilitate automated, efficient cleaning cycles for modular beverage dispensers.

20 Claims, 31 Drawing Sheets

Related U.S. Application Data continuation of application No. 17/248,210, filed on Jan. 14, 2021, now Pat. No. 11,440,784.

(60) Provisional application No. 63/068,292, filed on Aug. 20, 2020, provisional application No. 62/962,079, filed on Jan. 16, 2020.

(51) Int. Cl.
  *B67D 1/10* (2006.01)
  *G07F 13/02* (2006.01)
  *G07F 13/06* (2006.01)

(52) U.S. Cl.
  CPC ............. *B67D 1/0888* (2013.01); *B67D 1/10* (2013.01); *G07F 13/025* (2013.01); *G07F 13/065* (2013.01); *B67D 2001/0097* (2013.01); *B67D 2210/00034* (2013.01)

(56) References Cited

U.S. PATENT DOCUMENTS

| | | | |
|---|---|---|---|
| 7,439,859 B2 | 10/2008 | Humphrey | |
| 8,032,251 B2 | 10/2011 | Monn | |
| 8,161,865 B2 * | 4/2012 | Tso | A23L 27/28 99/275 |
| 8,910,563 B2 | 12/2014 | Hulett et al. | |
| 9,808,114 B1 | 11/2017 | Heys et al. | |
| 10,131,528 B2 | 11/2018 | Webster et al. | |
| 10,143,331 B1 | 12/2018 | Heys et al. | |
| 10,414,642 B2 | 9/2019 | Melville, Jr. et al. | |
| 10,544,028 B2 * | 1/2020 | Guy | G07F 9/02 |
| 10,638,870 B2 | 5/2020 | Studor et al. | |
| 11,116,352 B2 | 9/2021 | Herbert et al. | |
| 11,440,784 B2 * | 9/2022 | Venkatakrishnan | B67D 1/0888 |
| 11,535,504 B2 * | 12/2022 | Venkatakrishnan | G06Q 20/085 |
| 11,767,213 B2 | 9/2023 | Zubarik | |
| 2005/0236429 A1 | 10/2005 | Duck et al. | |
| 2006/0037969 A1 | 2/2006 | Jennings et al. | |
| 2006/0118581 A1 * | 6/2006 | Clark | B67D 1/0041 222/333 |
| 2009/0069949 A1 * | 3/2009 | Carpenter | B67D 1/0878 222/144.5 |
| 2009/0266245 A1 | 10/2009 | Kanuma et al. | |
| 2010/0268378 A1 | 10/2010 | Sharpley | |
| 2011/0168775 A1 * | 7/2011 | Van Zetten | B67D 1/0888 222/129 |
| 2013/0156903 A1 | 6/2013 | Bombeck et al. | |
| 2014/0107835 A1 * | 4/2014 | Biasi | B67D 1/0892 700/231 |
| 2014/0114469 A1 | 4/2014 | Givens et al. | |
| 2014/0166053 A1 | 6/2014 | Carson | |
| 2015/0013545 A1 * | 1/2015 | Egli | B67D 1/0079 222/129.1 |
| 2017/0011442 A1 | 1/2017 | Hu et al. | |
| 2017/0046904 A1 | 2/2017 | Studor | |
| 2017/0119200 A1 | 5/2017 | Bressi | |
| 2017/0190558 A1 * | 7/2017 | Ubidia | G05D 7/0682 |
| 2017/0215631 A1 | 8/2017 | Studor et al. | |
| 2017/0253473 A1 * | 9/2017 | Melville, Jr. | B67D 1/0046 |
| 2017/0283236 A1 | 10/2017 | Jagannathan et al. | |
| 2017/0365017 A1 | 12/2017 | Ells | |
| 2018/0303116 A1 | 10/2018 | Rubin et al. | |
| 2019/0112174 A1 * | 4/2019 | Alix | B67D 1/0001 |
| 2019/0174950 A1 | 6/2019 | Hendrickson et al. | |
| 2020/0154949 A1 | 5/2020 | Klein et al. | |
| 2021/0279666 A1 | 9/2021 | Sun | |
| 2021/0395069 A1 * | 12/2021 | Burda | G06F 3/017 |
| 2023/0021411 A1 | 1/2023 | Venkatakrishnan et al. | |
| 2023/0380623 A1 | 11/2023 | Koller et al. | |
| 2023/0416071 A1 | 12/2023 | Cline et al. | |
| 2024/0375928 A1 | 11/2024 | Venkatakrishnan et al. | |
| 2024/0375929 A1 | 11/2024 | Venkatakrishnan et al. | |
| 2024/0375930 A1 | 11/2024 | Venkatakrishnan et al. | |

FOREIGN PATENT DOCUMENTS

| | | | | |
|---|---|---|---|---|
| CN | 109700318 A | 5/2019 | | |
| CN | 109863112 | 6/2019 | | |
| CN | 109863112 A | 6/2019 | | |
| FR | 1464613 A | 1/1967 | | |
| WO | WO 97/41763 | 11/1997 | | |
| WO | WO 2001/62127 A2 | 8/2001 | | |
| WO | WO 2006/050563 A1 | 5/2006 | | |
| WO | WO-2016137930 A1 * | 9/2016 | ............... | A23G 9/04 |
| WO | WO 2019/006216 A1 | 1/2019 | | |
| WO | WO 2019/109137 A1 | 6/2019 | | |
| WO | WO 2021/146406 A2 | 7/2021 | | |
| WO | WO 2023/235710 | 12/2023 | | |
| WO | WO 2023/250358 A1 | 12/2023 | | |

OTHER PUBLICATIONS

"China's First Fully Robotic Coffee Booth by Cofe+. Is it a serious competition for Starbuck's & Co?" published on Jul. 4, 2021; for purposes of examination consider retrieved from the internet on Jul. 28, 2023, <https://www.youtube.com/watch?v=PKEh_luW5o4>.

International Search Report and Written Opinion issued in International Patent Application No. PCT/US2023/067633, dated Sep. 6, 2023 in 13 pages.

International Search Report and Written Opinion issued in International Patent Application No. PCT/US2023/068789, dated Sep. 28, 2023 in 19 pages.

International Preliminary Report on Patentability and Written Opinion issued in International Patent Application No. PCT/US2023/067633, dated Nov. 7, 2024 in 6 pages.

International Preliminary Report on Patentability and Written Opinion issued in International Patent Application No. PCT/US2023/068789, dated Dec. 18, 2024, in 7 pages.

* cited by examiner

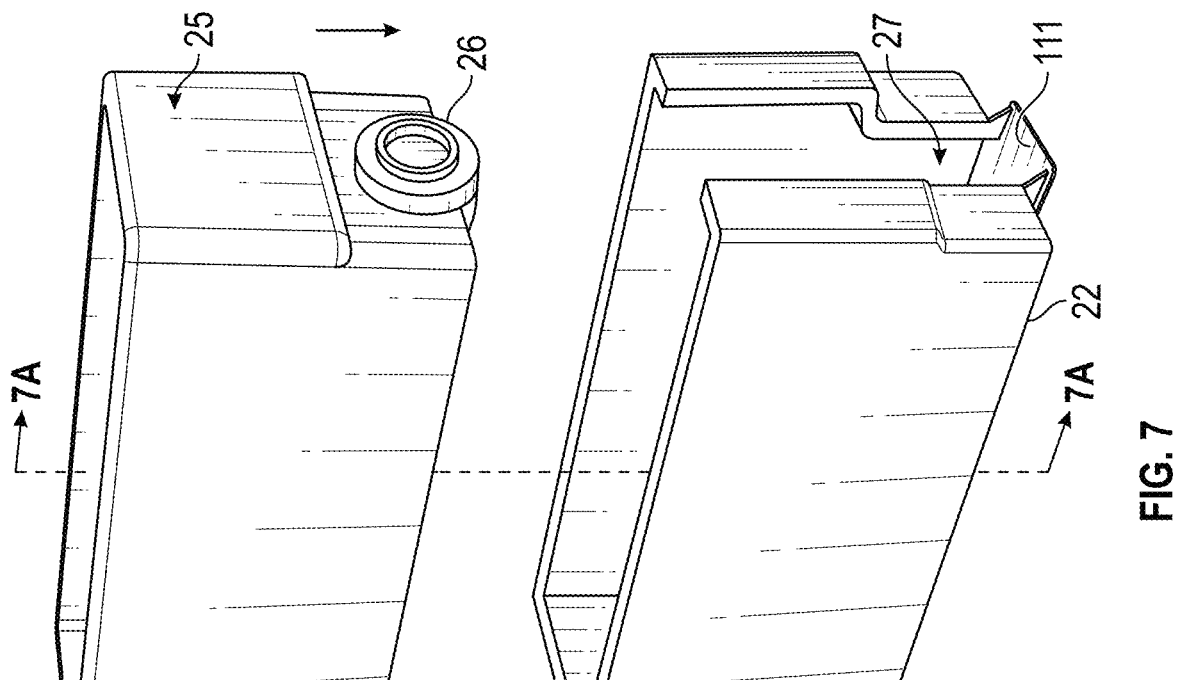
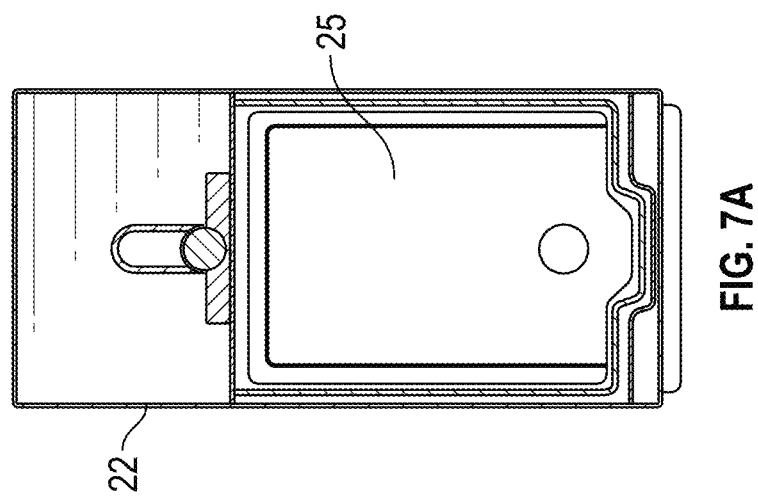

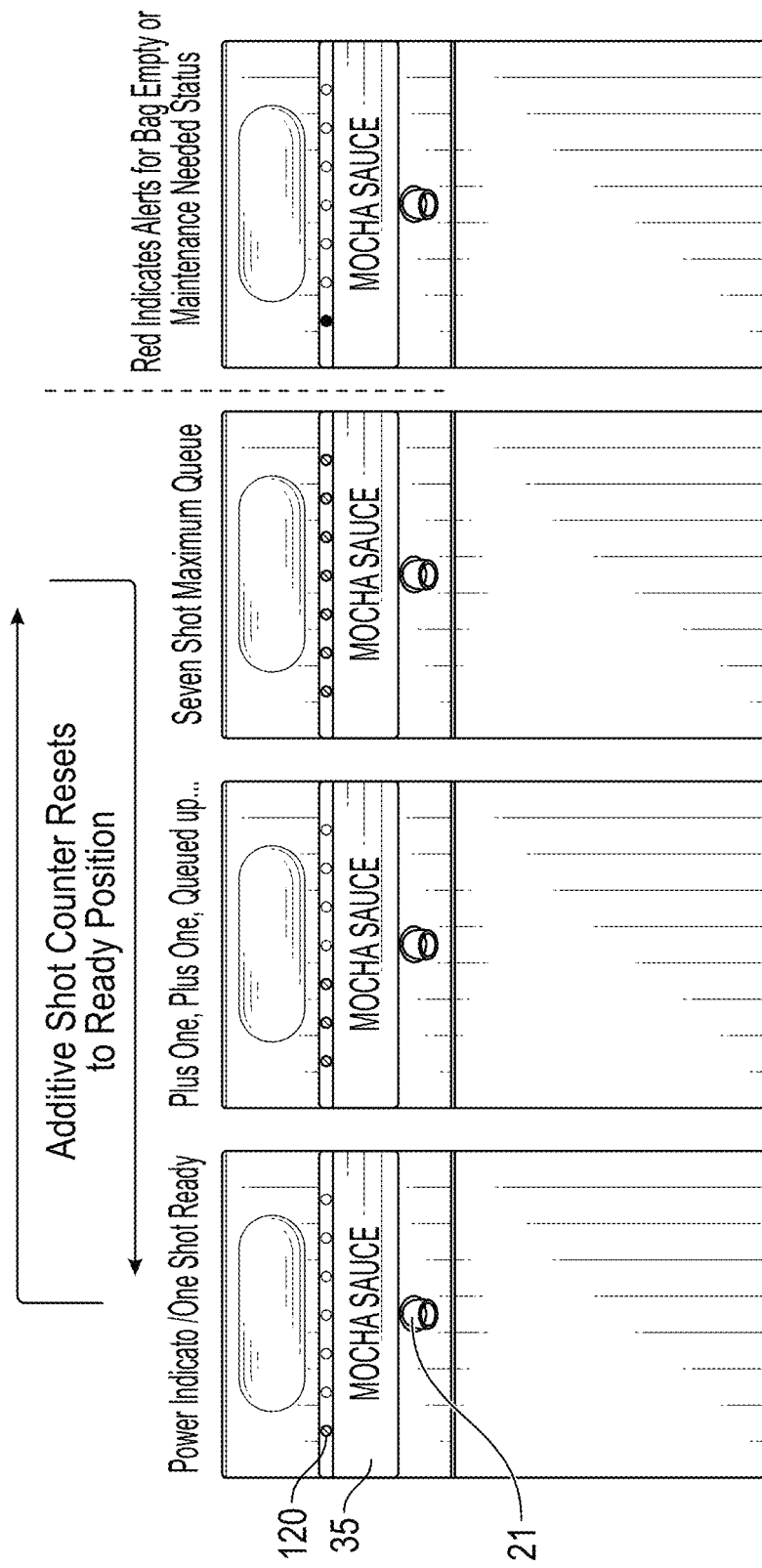

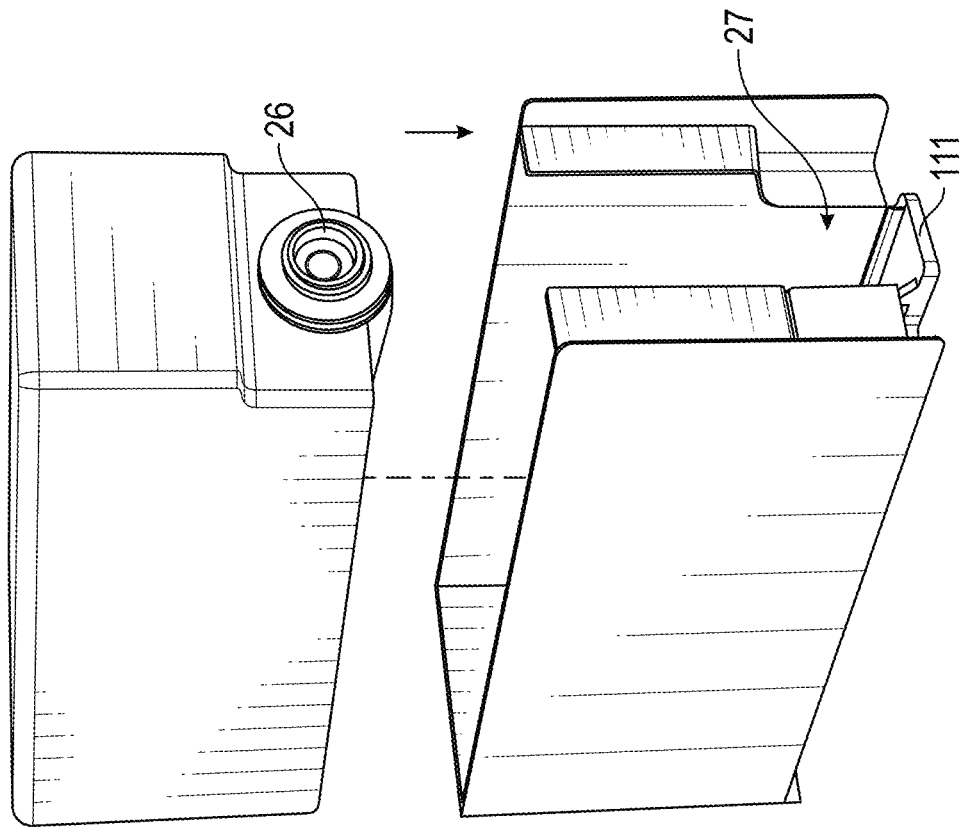
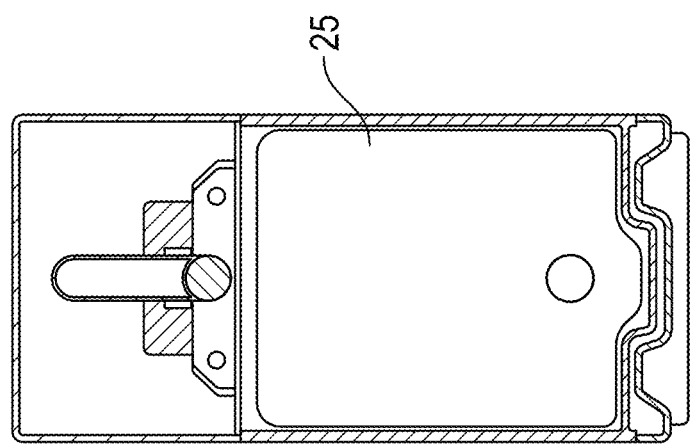
FIG. 24

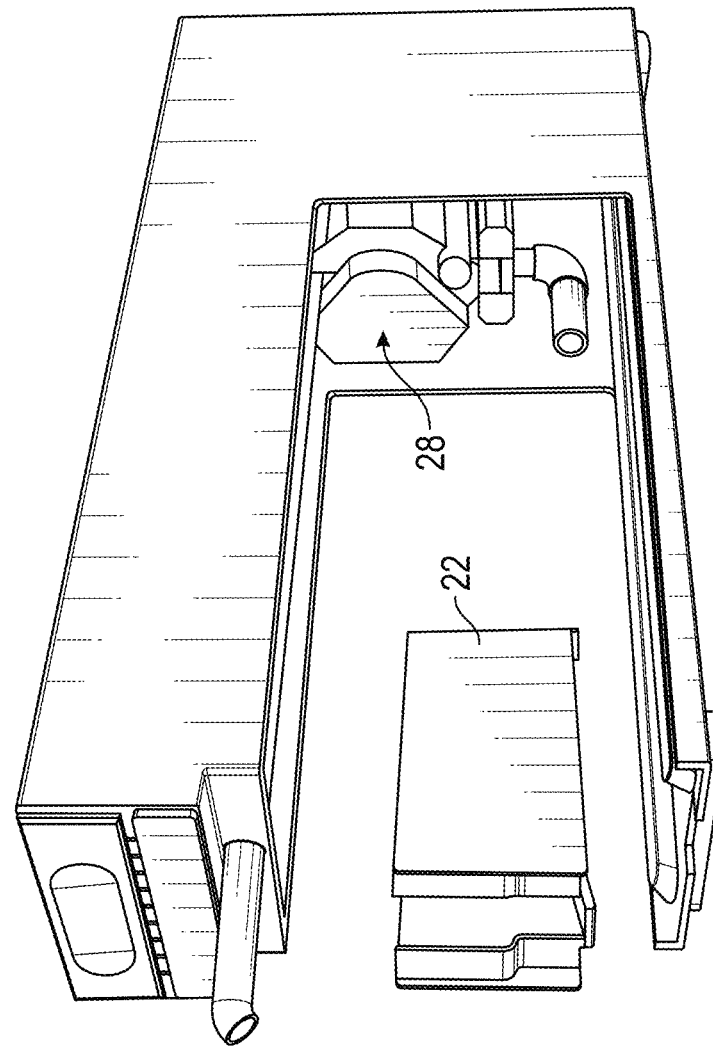
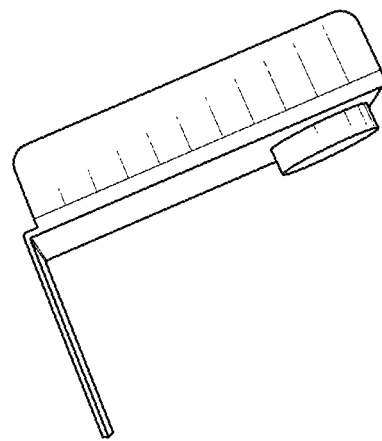
FIG. 27

AUTOMATED DISPENSING SYSTEM FOR CUSTOMIZED BEVERAGES

RELATED APPLICATIONS

This application is a division of U.S. patent application Ser. No. 17/837,999, filed Jun. 10, 2022, which is a continuation of U.S. patent application Ser. No. 17/248,210, filed Jan. 14, 2021, now U.S. Pat. No. 11,440,784 which claims the benefit of U.S. Provisional Application No. 62/962,079 filed Jan. 16, 2020 and of U.S. Provisional Application No. 63/068,292 filed Aug. 20, 2020, the entire contents of each of which are hereby incorporated by reference herein.

FIELD

The present disclosure generally relates to an automated modular dispensing platform for creating customized beverages (e.g., using various sauces, syrups, sweeteners, colors and/or flavors added to a base beverage). The automated dispensing platform may simultaneously aggregate beverage modifiers or ingredients (e.g., sweetener, flavor, and/or color) and facilitate automated, efficient cleaning cycles for modular beverage dispensers.

BACKGROUND

Customized beverages can be created by adding different quantities of sauces, syrups, and flavors to a base beverage, such as coffee or tea. Sauces, syrups and flavors are currently dispensed using disposable mechanical pumps as shown in FIG. 1 or reusable mechanical pumps as shown in FIG. 2. The sauce, syrup or flavor is filled in the pump containers 2 and 4. A barista pumps the sauce, syrup or flavor by manually pushing down on the pump levers 1 and 3 to dispense fixed volumes of sauces, syrups and flavors thru the pump nozzles 5 and 6.

BRIEF DESCRIPTION OF THE DRAWINGS

FIGS. 5, 6, 7 and 8 illustrate partial exploded views of the modular dispenser shown in FIG. 4. FIG. 7A is a cross-section view of FIG. 7.

FIGS. 15A-15D illustrate operation of an individual modular dispenser having a user interface with light indicators.

FIGS. 22-27 illustrate partial exploded views of the modular dispenser shown in FIG. 21.

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

DETAILED DESCRIPTION

Coffee or tea beverages usually have a base of coffee or tea extracts mixed with dairy enhanced by a variety of textures, tastes, flavors, colors and/or aromas. One can create different textures, tastes, flavors, colors and aromas by adding different quantities of ingredients or modifiers (e.g., sauces, syrups and flavors) or adding the same ingredients or modifiers in different sequences. For example, to create a menu offering of 70 handcrafted coffee beverages, there may be 10 flavors, 2 syrups and 7 sauces. Flavors are usually alcohol based. Examples of some flavors are vanilla, toffee nut, and hazelnut. Sauces are usually multiple ingredients blended together in a water solution. Examples of some sauces are white chocolate mocha, chai and mocha. Syrups are usually liquid forms of sugar or sugar-free substitutes.

Figure 2:
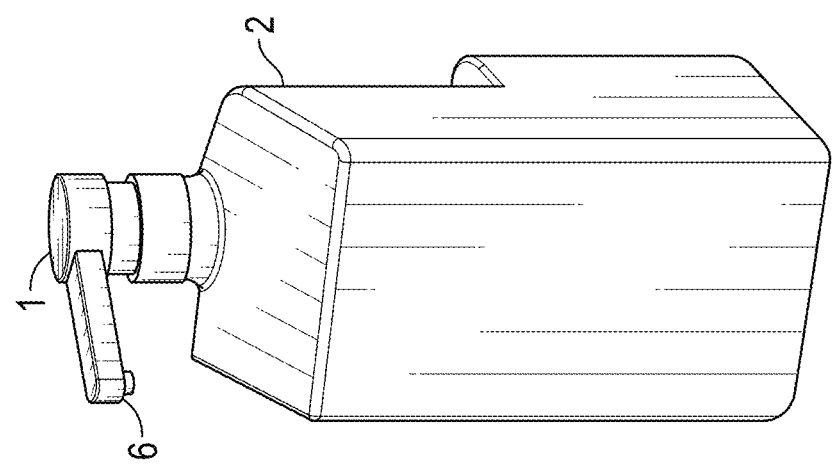
FIGS. 1 and 2 illustrate prior art pump containers.
Figure 1:
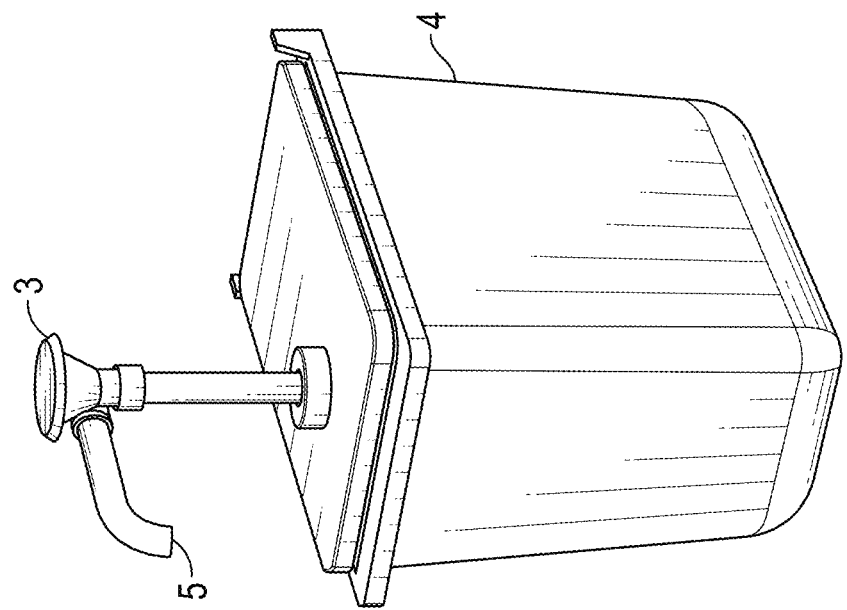

Currently, flavors, sauces, and syrups are dispensed using disposable mechanical pumps as shown in FIG. 1 or reusable mechanical pumps as shown in FIG. 2. The syrup, sauce or flavor is filled in the pump containers 2 and 4. The barista pumps the flavor, sauce or syrup by manually pushing down on the pump levers 1 and 2 to dispense fixed volumes of flavors, sauces and syrups thru the pump nozzles 5 and 6.

Sauces are inherently dense and viscous. Hence, it requires a lot of effort to manually push down on the pump lever. For very viscous sauces, forces in excess of 20 pounds to 30 pounds are required to dispense the sauce from a mechanical pump, such as those illustrated in FIGS. 1 and 2. Each beverage may require multiple pumps for multiple shots or doses. For a barista making hundreds of beverages on a shift, pumping sauces or other ingredients frequently with this high force can lead to arm fatigue and potential injuries.

A recipe for a creamy coffee beverage could be to dispense hot espresso coffee extract into a cup, followed by two pumps of vanilla syrup, followed by a pump of white chocolate mocha sauce, followed by a fixed volume of steamed almond milk and finished with two pumps of toffee nut flavor. The recipe for a non-creamy beverage could be the same ingredients and quantities but dispensed in a different order (e.g., dispense a pump of white chocolate mocha sauce, followed by two pumps of vanilla syrup, followed by a fixed volume of steamed almond milk and followed with two pumps of toffee nut flavor and finished by dispensing a hot espresso coffee extract on top). Different beverages are made not only by varying the type and quantities of ingredients or modifiers (e.g., sauces, syrups and flavors), but also by changing the order in which they are added to the beverage.

A coffee store may offer a menu with 80-100 hand-crafted beverages. This means that each barista must memorize the recipes for each of the 80-100 beverages, including the ingredients or modifiers (e.g., sauces, syrups and flavors) in each beverage, the number of pumps, shots or doses, and the order in which the ingredients or modifiers are added. This creates a lot of complexity and memorization effort, which creates a challenge to expansion of the size and variety of the menu (e.g., variety of beverages).

If the coffee store uses disposable pumps as shown in FIG. 1, it leads to negative environmental impact due to discarding of the plastic containers once they are empty. If the coffee store uses reusable pumps as in FIG. 2, then the pumps must be disassembled and manually cleaned regularly (e.g., every week), which requires a lot of manual effort and additional time expended by employees, thereby increasing labor costs and reducing employee morale. In addition, each mechanical pump unit is customized to the sauce, syrup, or flavor being dispensed because of their unique density and viscosity. Errors (e.g., malfunctions) happen when the sauce, syrup or flavor is filled in the wrong pump container (e.g., a pump unit designed for a different sauce, syrup or flavor).

When a coffee store introduces a new beverage recipe that uses a new type of sauce, syrup, or flavor, it must procure a new pump unit or system customized to the new ingredient. This is expensive as a new container needs to be manufactured and filled for every new type of ingredient. This leads to lot of complexity in the store as the store must procure, store, and use a variety of pumps for all the different ingredients (e.g., sauces, syrups and flavors). The baristas must also be retrained on the new recipes.

Customers like to adjust the amount of ingredients, modifiers, or enhancers (e.g., sauce, syrup, and flavor) in their beverages to suit their individual taste and health needs. For example, a customer may want half the sugar and twice the amount of vanilla flavor of the normal recipe for a particular beverage. The current pump systems allow for a reduction in a discrete number of manual pumps, but do not allow for a fraction of a pump of an ingredient (e.g., syrup, sauce, or flavor) to be pumped. This is inherently problematic to the customer experience as customers want more customization with precise control. In addition, baristas may want to simplify the mental and physical efforts required in the beverage preparation process.

In accordance with several embodiments, the systems described herein advantageously automate the dispensing of ingredients, modifiers or enhancers (e.g., sauces, syrups, flavors, tastes, colors, reductions). The systems include modular dispensers, or dispenser modules, that can dispense any type of ingredient without any force (e.g., any manual pumping force) exerted by the barista. A user interface may guide the barista through the sequence of dispensing (including the recipes for various beverages), thereby avoiding memorization of recipes, while also doing away with the complexity of cleaning (e.g., of manually cleaning multiple reusable pump containers or units on a regular basis).

Figure 3:
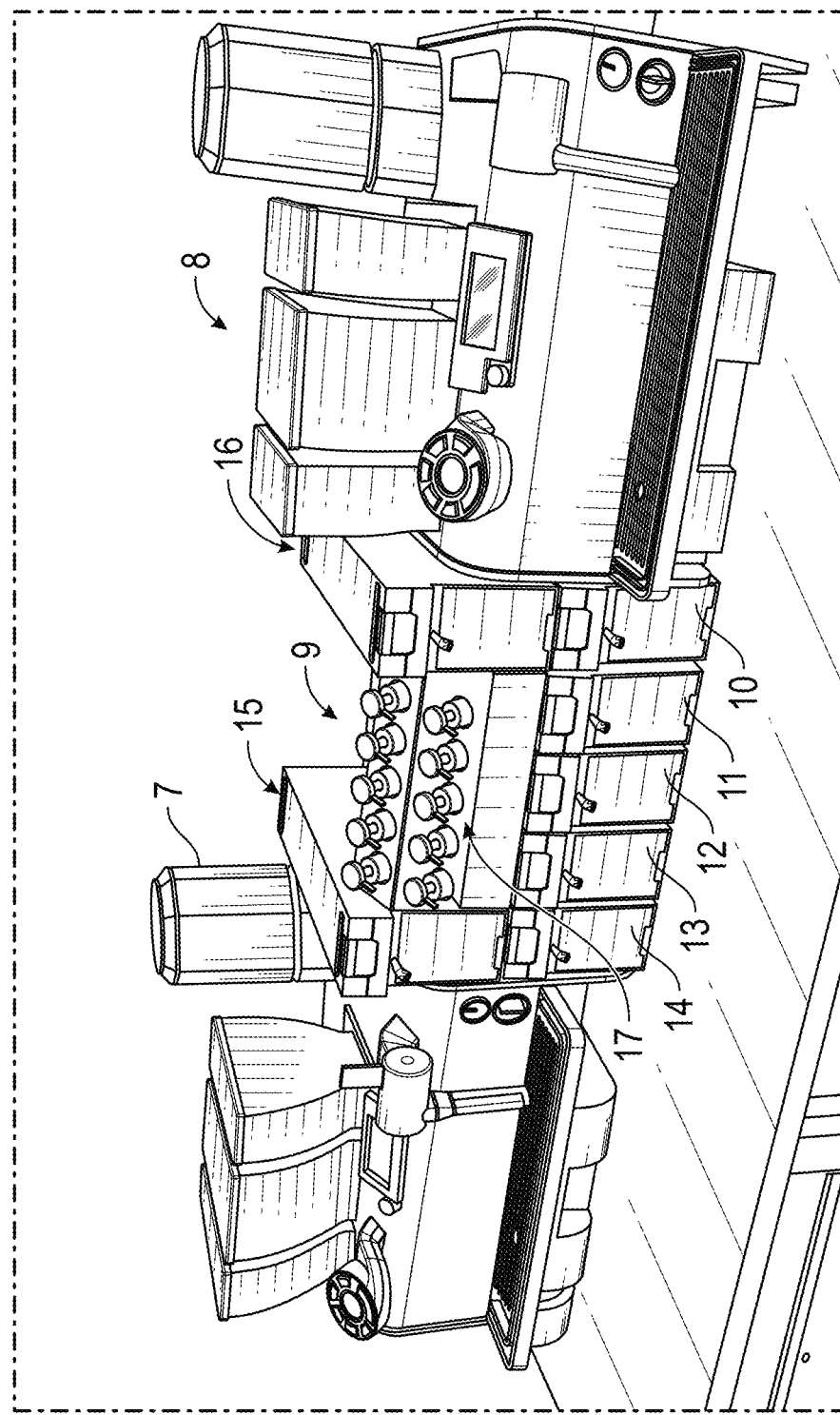
FIGS. 3 and 3A illustrate automated dispensing systems.

FIG. 3 shows an automated dispensing system 9 according to an embodiment of the present disclosure. Coffee espresso machines 7, 8 extract coffee liquor out of coffee beans. The automated dispensing system 9 may be located or positioned to sit between two espresso machines for easy access by two baristas working on each of the coffee espresso machines. The automated dispensing system 9 comprises one or more individual modular dispensers, or dispenser modules 10-16. The automated dispensing system 9 may include a shelf 17, for example between modular dispensers 15, 16 of the dispensing system 9, to store one or more manual pumps for less frequently-used flavors or other ingredients, modifiers, or enhancers. The individual modular dispensers 10-16 are modular (meaning, for example, they can be added to or removed from the system 9 quickly and easily in different configurations without impacting other modular dispensers or operation of the system 9). The individual modular dispensers 10-16 may be controlled from, or by, one or more controllers. For example, the individual modular dispensers 10-16 may be controlled from, or by, a single centralized controller that supplies power and control signals (which may include data or other information, such as recipe information) to each of the modular dispensers 10-16. In other configurations, each modular dispenser may be controlled by its own dedicated local controller or subgroups of modular dispensers may be controlled by a controller.

Figure 3A:
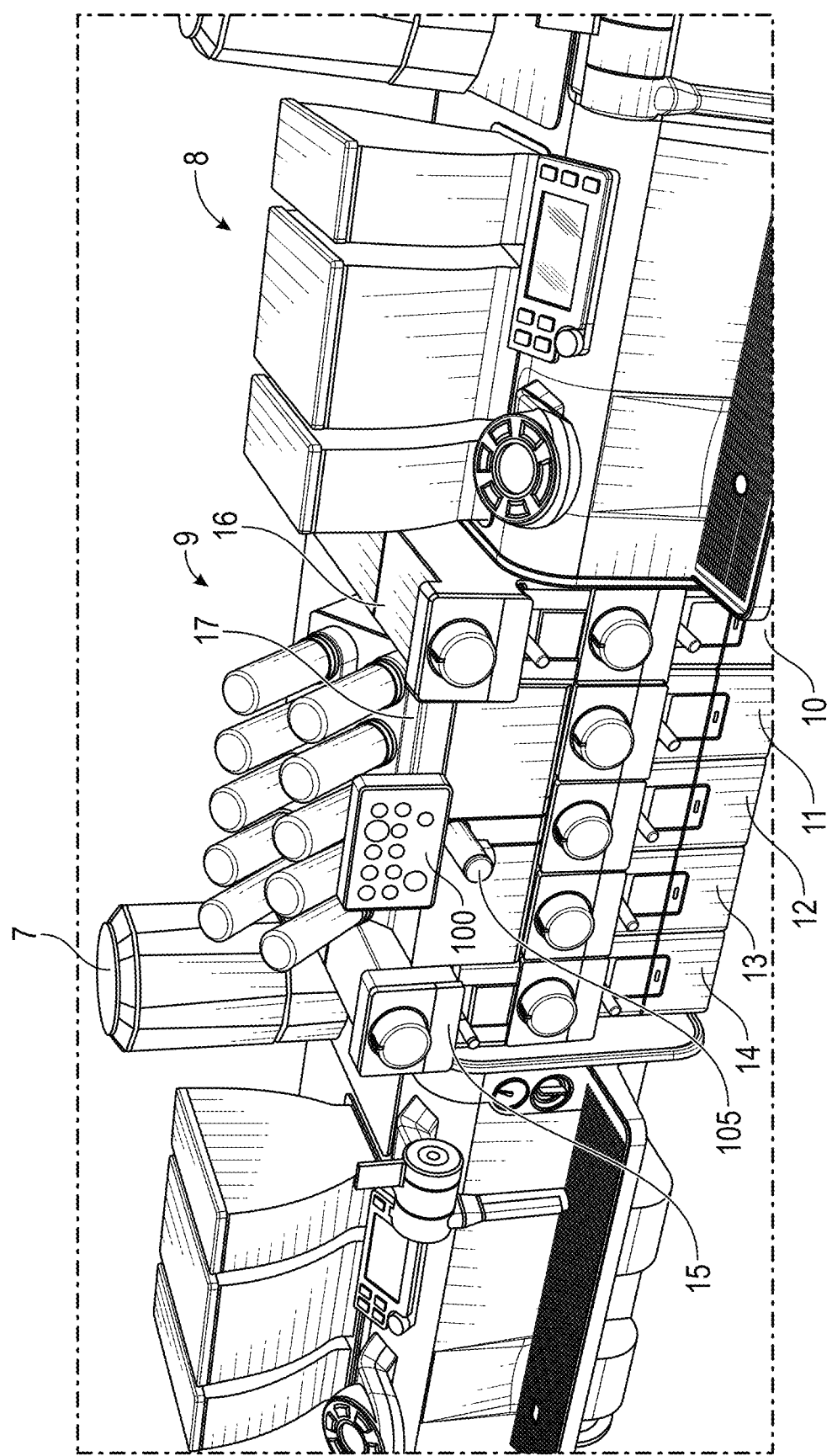

FIG. 3A shows another embodiment of the automated dispensing system 9 with bottles, cartridges, and/or pouches instead of manual pumps as shown in FIG. 3. The automated dispensing system 9 of FIG. 3A may replace a shelf with an integrated flavor holding portion. The system 9 may include a central display screen 100 as an alternative to, or in addition to, individual display screens on the modular dispensers 10-16. The display screen 100 may comprise a touchscreen display configured to receive user input based on pressing of graphical buttons or icons on a graphical user interface of the display screen 100 in addition to displaying graphics, animations, and alphanumeric textual information to the barista. The automated dispensing system 9 may also include a centralized dispenser spout 105. The dispenser spout 105 may dispense water (either hot or cold water) or a prepared beverage. In some implementations, the automated dispensing system includes a centralized water dispensation system to dispense water. The display screen 100 may also display information or instructions to the barista or other user (e.g., to prompt action or to indicate errors, warnings or alerts).

Individual modular dispensers 10-16 may replace conventional manual pump systems with an electrical pump system to alleviate arm fatigue and mind fatigue. The automated dispensing system 9 may also advantageously increase throughput and reduce errors in beverage preparation, thereby enhancing customer satisfaction and experience. As explained further below, the dispense instructions (e.g., number of pumps or shots or doses) may be input by an individual barista through a user input device (e.g., touchscreen display or user interface buttons) on the modular dispenser or remote from the modular dispenser, especially if the dispense instructions deviate from a standard recipe for the beverage. Alternatively, the dispense instructions may be automatically received by the automated dispensing system 9 from a point of sale system or remote server. Even when the dispense instructions are received from a point of sale system or other remote system, the user (e.g., barista) may be able to modify the dispense instructions manually (e.g., if a customer changes their mind after an initial time of sale).

Figure 4:
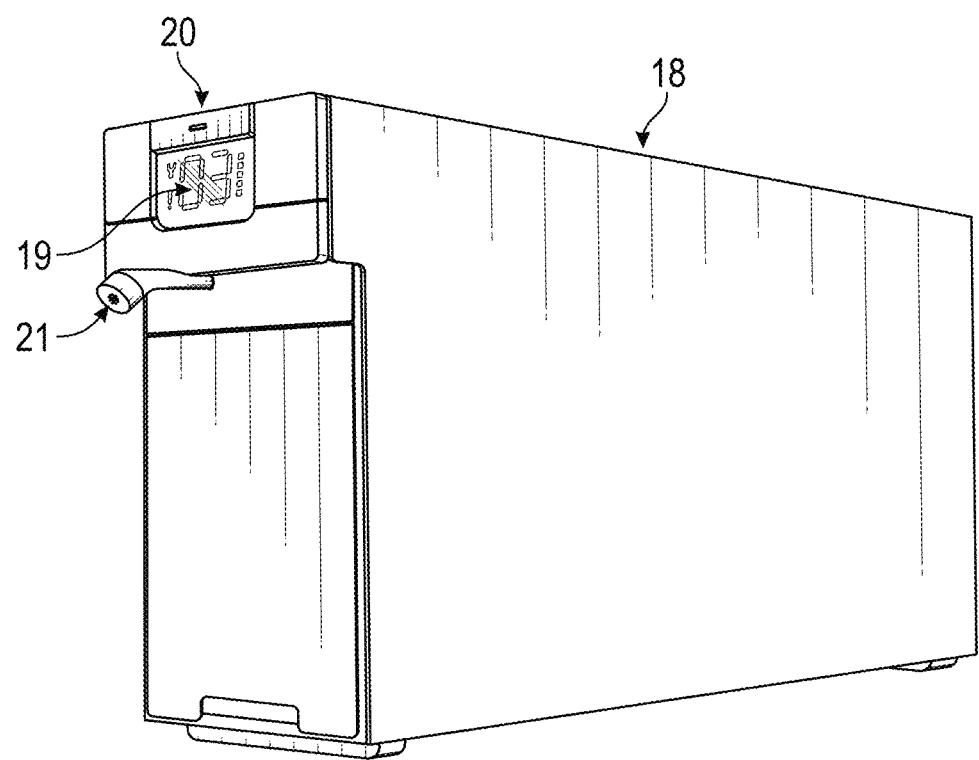
FIG. 4 illustrates a modular dispenser, or dispenser module, that may be used with the automated dispensing systems shown in FIGS. 3 and 3A.

FIG. 4 shows an embodiment of one of the modular dispensers 10-16 having a housing 18 that houses internal components of a respective modular dispenser 10-16. As shown in FIG. 4, each modular dispenser 10-16 may include a display 19 that shows operational dispensing information for that modular dispenser 10-16 to the barista. The information can include number of pumps (e.g., shots or doses) being dispensed, volume being dispensed, amount of sauce or other ingredient left in the modular dispenser, cleaning status, etc. The display 19 showing the operational status of the modular dispenser 10-16 enables the barista to react and change the settings, if required and/or desired. The display 19 can be in the form of light indicators, LEDs, LCD displays, OLED displays or any other form of display. Each modular dispenser 10-16 may include input devices 20, such as a lighted button input device. A barista can click or press the button or other input device to change the status/value on any of the icons on the display 19. This can also be accomplished by making the display 19 a touch screen, so that the barista can directly change values on the display 19 by touching them with his or her finger. The display 19 may have the capability to show multiple languages. The desired language may be selected by the barista or other user. Other types of input devices 20 may include a switch, knob, wheel, slide key, capacitive touch sensor, voice recognition input devices (e.g., a microphone), remote input devices, etc. Each modular dispenser 10-16 also includes a dispensing spout 21 positioned sufficiently high to allow a cup or other vessel to be placed beneath it.

Each modular dispenser 10-16 can be changed or adapted to dispense any ingredient by changing certain pump characteristics or dispensing parameters (e.g., the pump speed, timing, volumetric dispensation, and algorithm of dispensing). This changing or adjustment can be performed remotely in a digital twin or can be performed at the local machine unit. For example, the ingredient in a particular modular dispenser can be identified (or selected) using the user interface (e.g., button 20 and/or display 19) on the particular modular dispenser or the ingredient in the particular modular dispenser can be identified (or selected) in the remote server. Once the appropriate ingredient is selected, the particular modular dispenser may be automatically programmed with the necessary pump characteristics.

The modular dispenser 10-16 can also have a sensing or reading device that can identify the ingredient (e.g., sauce, syrup, or flavor) being loaded into the modular dispenser and automatically program itself to dispense the ingredient (for example, the specific speed or timing needed for optimal dispensation). As one example, the modular dispenser can have a load cell to sense the ingredient based on weight or mass. As another example, the identification of the ingredient can be a barcode, RFID tag, NFC tag, QR code or any other identifiable information on the packaging containing the ingredient.

The modular dispenser 10-16 can be hot swapped with another modular dispenser, for example if a modular dispenser malfunctions, runs out of ingredient, or is in low demand. The new modular dispenser can adopt (e.g., automatically or based on user interaction) the dispensing characteristics of the replaced modular dispenser. The modular dispenser may include the same or different ingredient. The system 9 can recognize the ingredient in the modular dispenser regardless of the location of the modular dispenser within the system 9. Accordingly, the modular dispensers may be positioned in any order or stackable configuration preferred by a store manager or by individual baristas.

Figure 5:
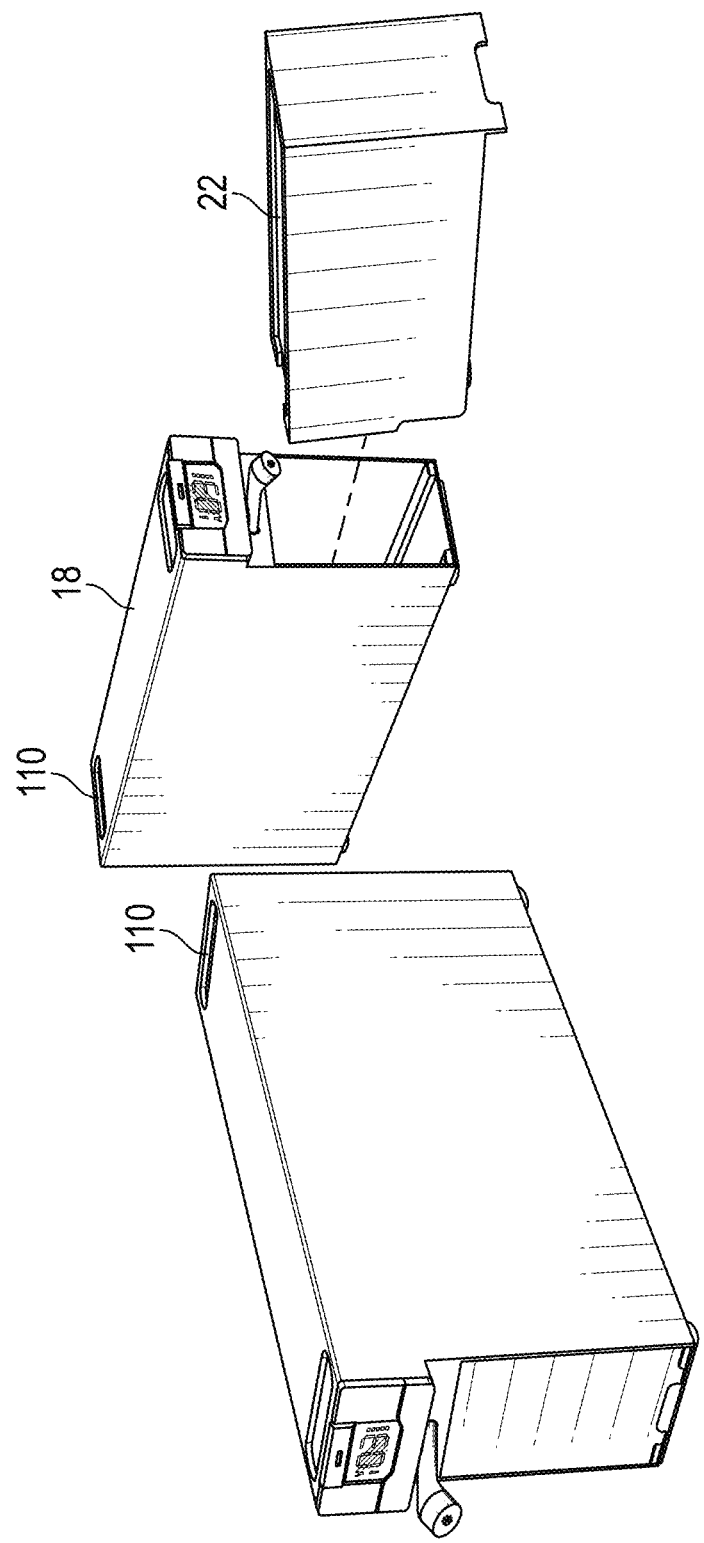
Figure 6:
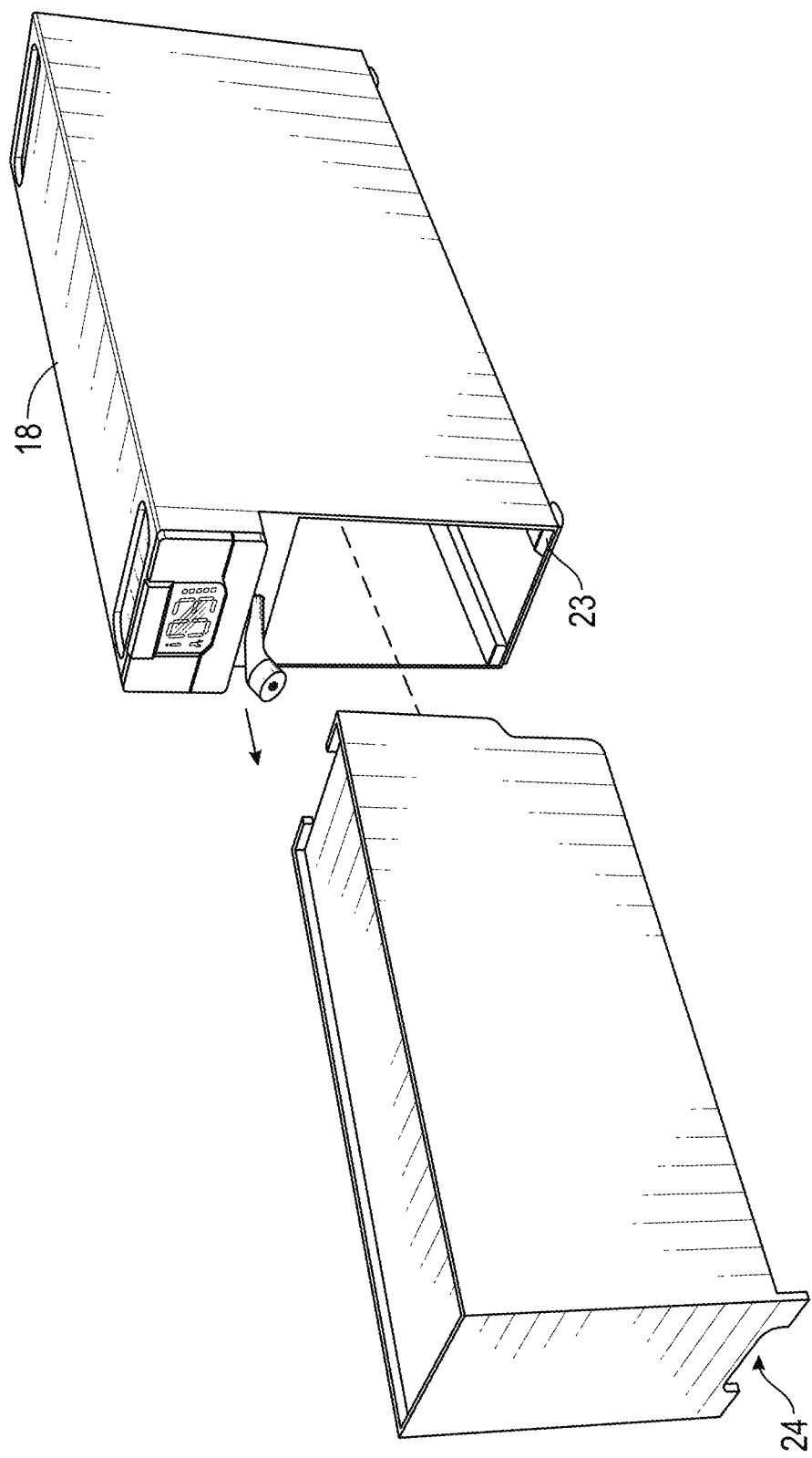

FIGS. 5 and 6 show one possible construction of the modular dispensers 10-16. The modular dispenser 10-16 may include a tray 22 to hold the ingredient, modifier, or enhancer (e.g., sauce, syrup or flavor) to be dispensed. The ingredient can be poured into the tray 22 or can be loaded into the tray 22 in a bag holding the ingredient (e.g., sauce, syrup or flavor). The tray 22 can be made from metal, plastic or a biodegradable material. The tray 22 may include a pull feature 24 to facilitate pulling out of the tray 22 from the housing 18. As shown, the pull feature 24 can include a cutout or notch at the bottom of a front surface of a front panel of the tray 22. The pull feature 24 may alternatively include a knob or other protruding member that can be grabbed and pulled by one or more fingers. The tray 22 may comprise an injection molded enclosure having about a 3 liter capacity. The capacity of the tray 22 may range from 1.5 liters to 5 liters (e.g., 1.5 liters to 4.5 liters, 2 liters to 4 liters, 2.5 liters to 3.5 liters, 3 liters to 5 liters, overlapping ranges thereof, or any value within the recited ranges).

The tray 22 may be removably positioned (e.g., inserted) in a housing 18. The modular dispenser housing 18 may include guiding features 23 incorporated into the housing 18 and/or tray 22 so that the tray 22 can be easily pushed in and pulled out of the housing 18. The guiding features 23 may comprise guide rails stamped into the housing 18 or grooves formed in the housing floor. The housing 18 may comprise a sheet metal enclosure in one configuration. The housing 18 may be formed of a metal, plastic or other polymeric material. The housing 18 may include one or more detents 110 on an upper surface to facilitate stacking of modular dispensers 10-16 on top of each other. The detents 110 may be positioned, sized, and shaped to receive locking features 34 (e.g., feet or pegs) disposed on a bottom surface of another modular dispenser.

In some implementations, the ingredient (e.g., syrup, sauce, or flavor) can be packaged into a bag 25 with a valve 26 that can be easily loaded into (e.g., lowered in a vertical direction into an upper opening of) the dispensing tray 22. FIG. 7 shows an ingredient bag 25 having a valve 26 that slides into a locating feature 27 on a rear surface of the tray 22. The locating feature 27 may include a tray keying slot configured to receive a valve cap of the valve 26. A rear surface of the tray may include a drip catch feature designed to catch any drips from the valve 26. FIG. 7A is a cross-section view showing the bag 25 loaded inside the tray 22. The capacity of the bag 25 may range from 1.5 liters to 5 liters (e.g., 1.5 liters to 4.5 liters, 2 liters to 4 liters, 2.5 liters to 3.5 liters, 3 liters to 5 liters, overlapping ranges thereof, or any value within the recited ranges, such as 3 liters).

Figure 8:
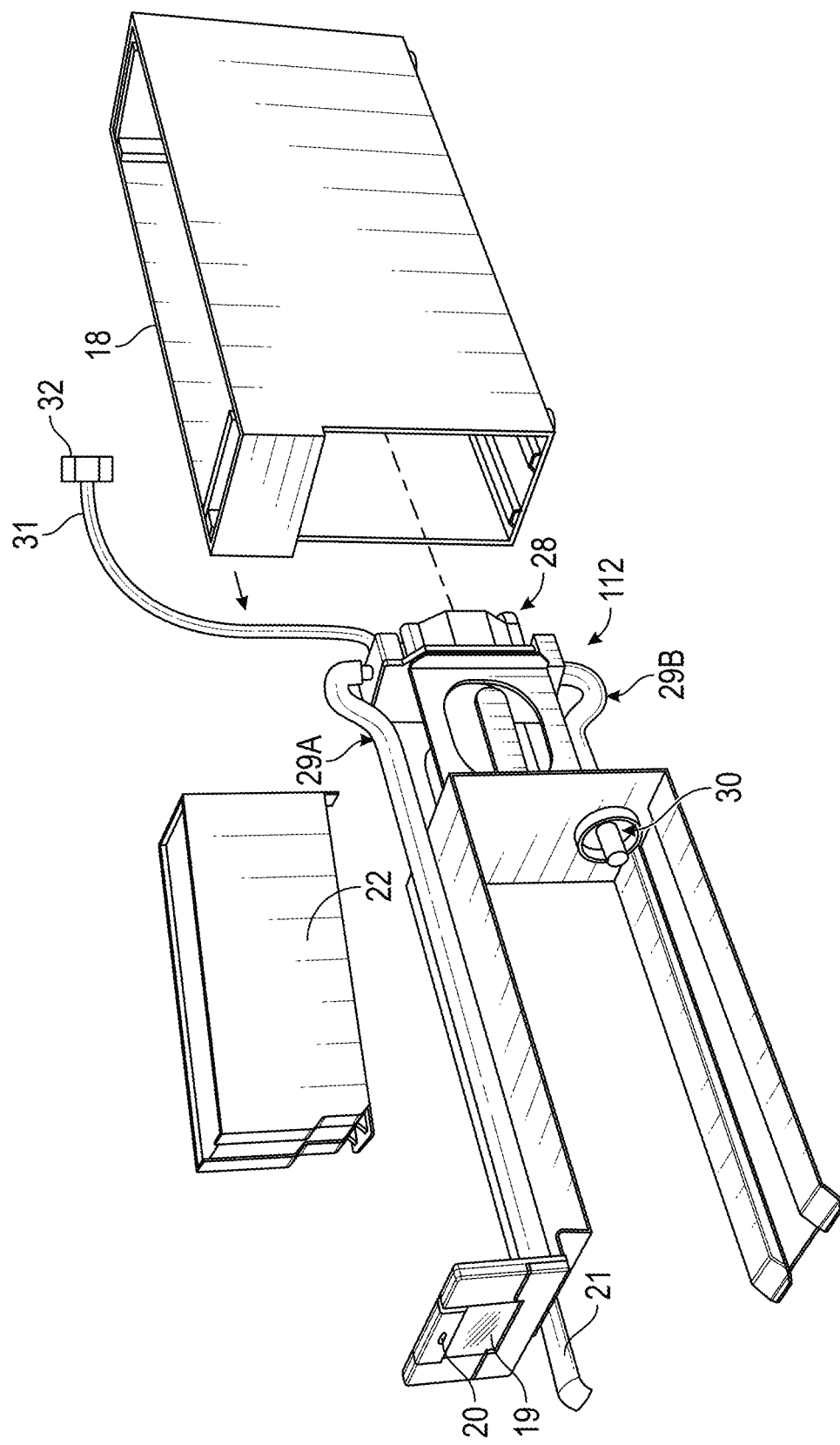

As shown in FIG. 8, each modular dispenser housing 18 may hold a removable pump frame 112 that can slide in and out of the housing 18. The pump frame 112 includes a pump 28, such as a positive displacement pump (including but not limited to a peristaltic pump), attached at the rear of the pump frame 112. Various type of pumps 28 can be used within the dispensing system 9 to pump the ingredients. For example, the dispensing system 9 may include individual modular dispensers 10-16 with two or more different types of pumps. For example, a first set of modular dispensers may include a first type of pump for low viscosity and low density ingredients, and a second set of modular dispensers may include a second type of pump for high viscosity and high density ingredients.

The pump 28 draws in the ingredient (e.g., syrup, sauce, flavor) through an inlet tube 29B and pumps the ingredient out through an outlet tube 29A into a cup or pitcher thru the dispenser spout 21. The outlet tube 29A may include a flow meter to measure a volumetric dispensation of the ingredient. The dispenser spout 21 may have special features to incorporate air or water into the pumped ingredient as the ingredient exits the spout 21 (e.g., to generate froth). The inlet tube 29B terminates in a fluid connector 30.

The fluid connector 30 may be a quick connect fitting or coupling, e.g., the connector 30 should seal to the bag 25 in a leak-proof manner as soon as the bag 25 is attached to the connector 30. The connector 30 may include a self-sealing valve. The connector 30 may alternatively comprise a threaded or flanged connection.

The pump 28, the display 19 and the input device 20 are connected to a main controller 38 through an electrical wire harness 31 that terminates in an electrical connector 32. The harness 31 and connector 32 have the requisite conductors to transmit power and two-way communications (e.g., data) to/from the pump 28, display 19, and input device 20. The pump 28, display 19, and input device 20 may or may not have embedded software to make these devices function. All the functional hardware and software to make these devices function could be built into the main controller in some configurations.

The individual modular dispenser may have a self-priming mechanism that may be actuated by the user interface. Priming may only need to be initiated after a cleaning cycle and upon refilling supply lines. Once the pump has been primed, the ingredients can be changed without losing prime.

The system 9 can pump and dispense enough ingredient to fill all the input and output lines (e.g., outlet tube 29A and inlet tube 29B) for the pump 28 in order to prevent air pockets in the ingredient that could make dispensation inaccurate. When there is air in the outlet tube 29A, it is easier to pump and the motor runs faster. The modular dispenser 10-16 can sense the motor speed to prime the pumping system. If motor speed is high, it means there is air in the pumping system, and the pump 28 keeps pumping until the air pockets are pushed out and the speed of the motor drops to the normal operating limits.

Each modular dispenser can include a load cell at a bottom of the modular dispenser or of the tray 22 so that the modular dispenser can sense a weight or mass of ingredient in the bag 25 or tray 22 and alert a barista to change out the bag 25 when ingredient is low without losing priming.

Figure 9:
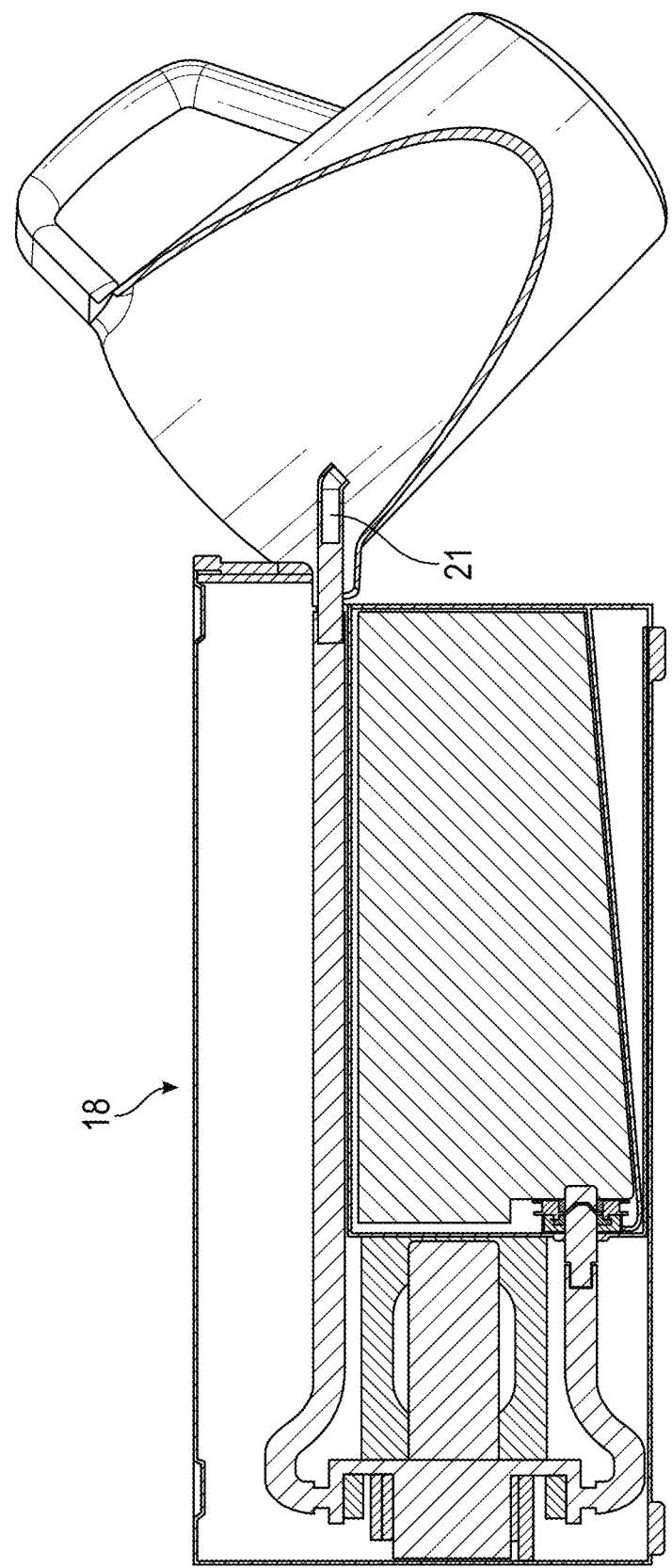
FIG. 9 illustrates a cross-section of a modular dispenser.

The modular dispenser 10-16 may be designed so that the ingredient can be easily dispensed into a pitcher, cups and glasses as shown in FIG. 9. For example, a height and angle of the dispenser spout 21 may be positioned to facilitate dispensation of the ingredient. A length of the housing 18 may range from 350 mm to 600 mm (e.g., between 350 mm and 500 mm, between 400 mm and 500 mm, between 450 mm and 600 mm, overlapping ranges thereof, or any value within the recited ranges). A height of the housing 18 may range from 175 mm to 350 mm (e.g., between 175 mm and 250 mm, between 200 mm and 250 mm, between 250 mm and 350 mm, overlapping ranges thereof, or any value within the recited ranges). A counter height from counter to dispenser spout 21 may range from 125 mm to 200 mm (e.g., from 125 mm to 150 mm, from 140 mm to 160 mm, from 150 mm to 200 mm, overlapping ranges thereof, or any value within the recited ranges, such as about 150 mm).

Figure 10:
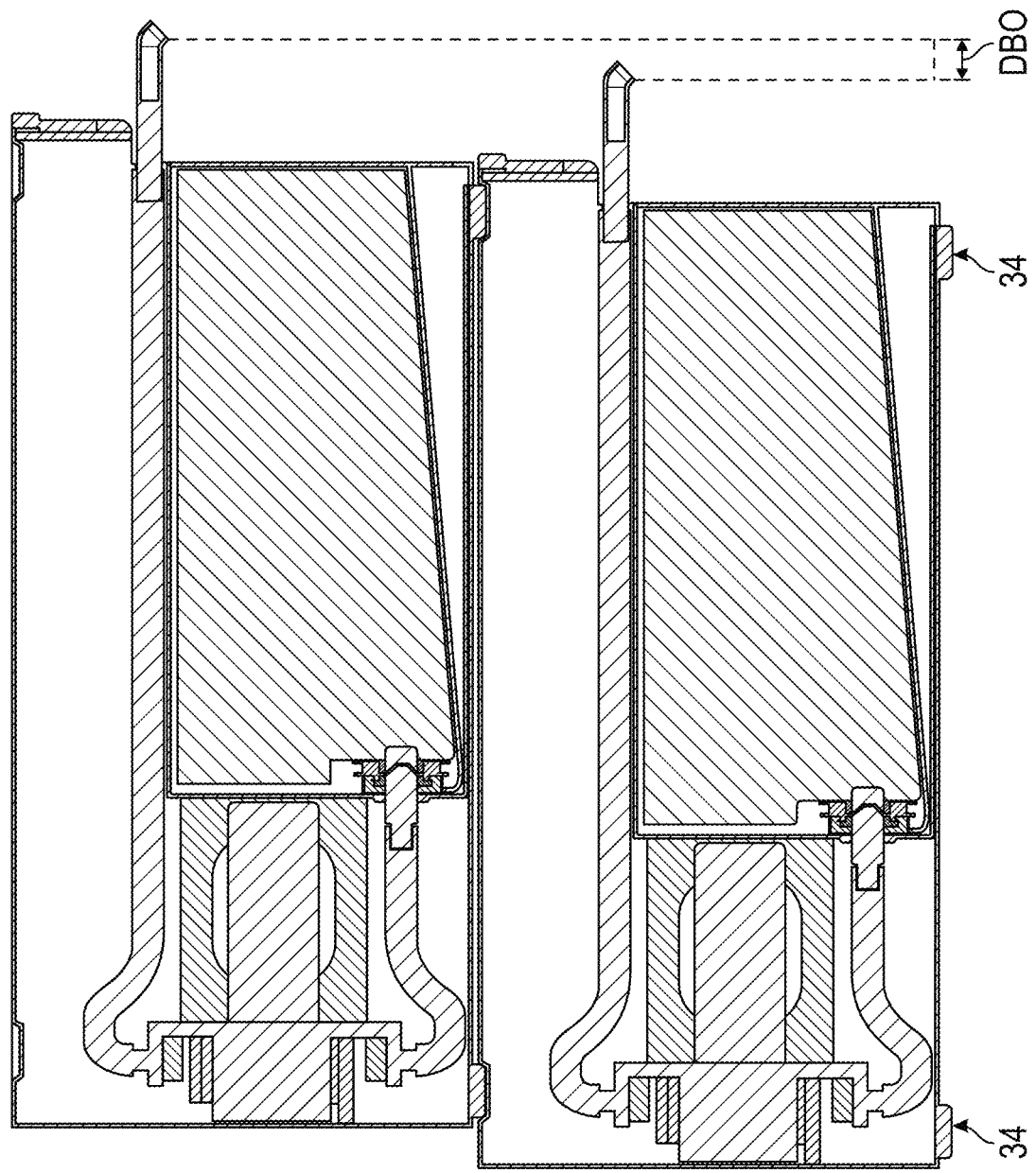
FIG. 10 illustrates an implementation including stacked modular dispensers.

As shown in FIG. 10, the modular dispensers 10-16 may be designed so that two or more modular dispensers 10-16 can be stacked on top of each other using locating and locking features 34. The modular dispensers 10-16 may be stacked such that the dispenser spout 21 of an upper modular dispenser is offset from the dispenser spout 21 of a lower modular dispenser by a drip bypass offset (DBO) distance. For example, the spout 21 of the lower modular dispenser may be rearward of the spout 21 of the upper modular dispenser. This may be accomplished by staggering the position of the upper modular dispenser relative to the lower modular dispenser. The offset (DBO) prevents the spout 21 of the upper modular dispenser from dripping onto the spout 21 of the lower modular dispenser.

Figure 11:
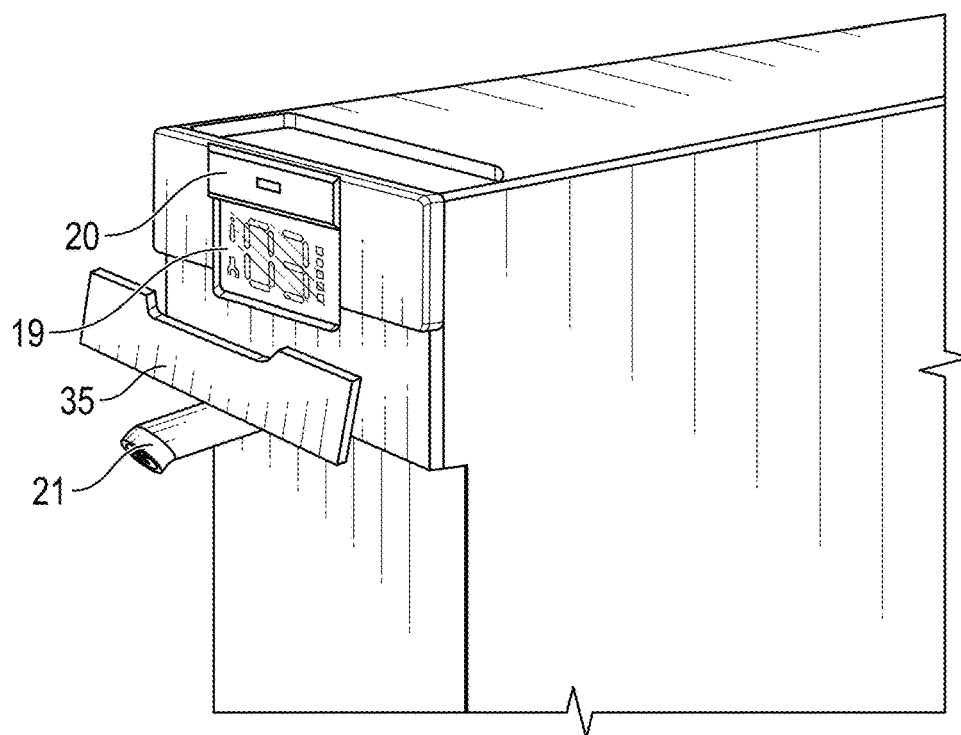
FIG. 11 illustrates a label plate for a modular dispenser.

Each modular dispenser can include a badge 35 to show the ingredient currently stored in that particular modular dispenser, as shown in FIG. 11. The badge 35 can be fastened (e.g., removably fastened) to the modular dispenser using magnets, adhesives or screws. The badge 35 may be positioned above the dispensing spout 21 and below the display 19 (or user input device 20 if there is no display 19). The badge 35 may comprise a label or plate.

Figure 12:
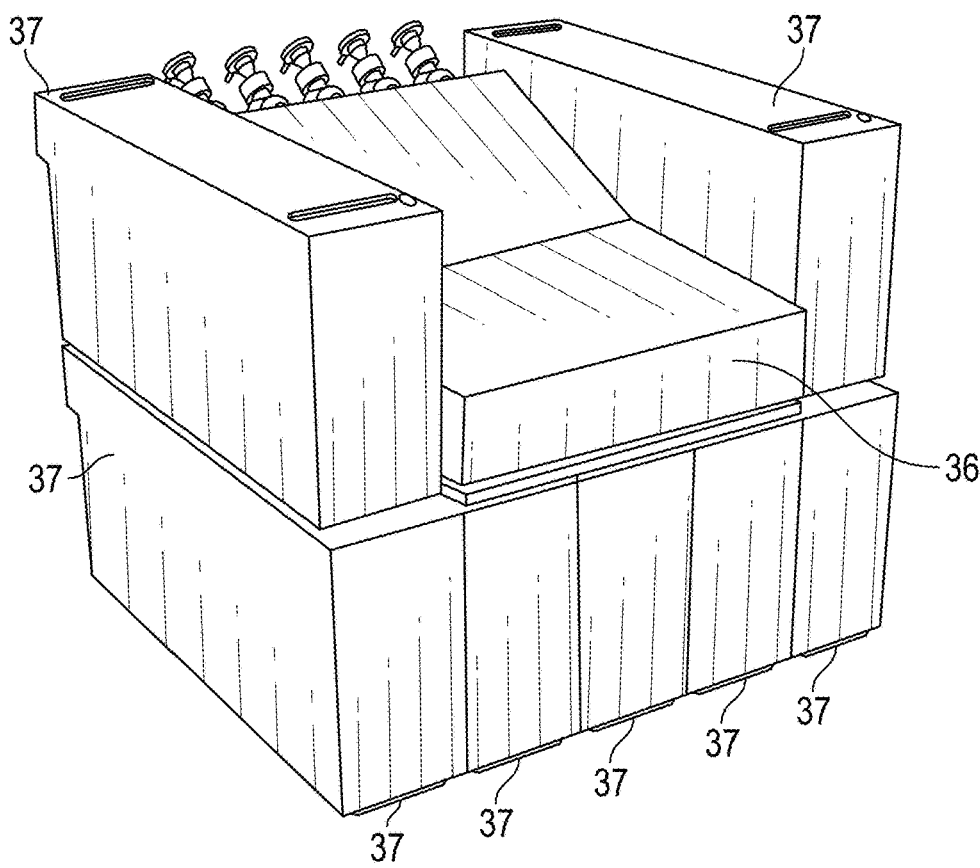
FIG. 12 illustrates a rear view of the dispensing system shown in FIG. 3.

FIG. 12 shows a perspective rear view of the dispensing system 9. In FIG. 12, the individual modular dispensers 37 (e.g., modular dispensers 10-16) are controlled by a main, or central, controller unit 36. The central controller unit 36 has the processing capability and power required to run the individual modular dispensers 37. This centralized control makes the design cost-efficient and easily upgradeable. In this modular design, the controller 36 can be upgraded for features and functionality without upgrading the individual modular dispensers 37.

Figure 13:
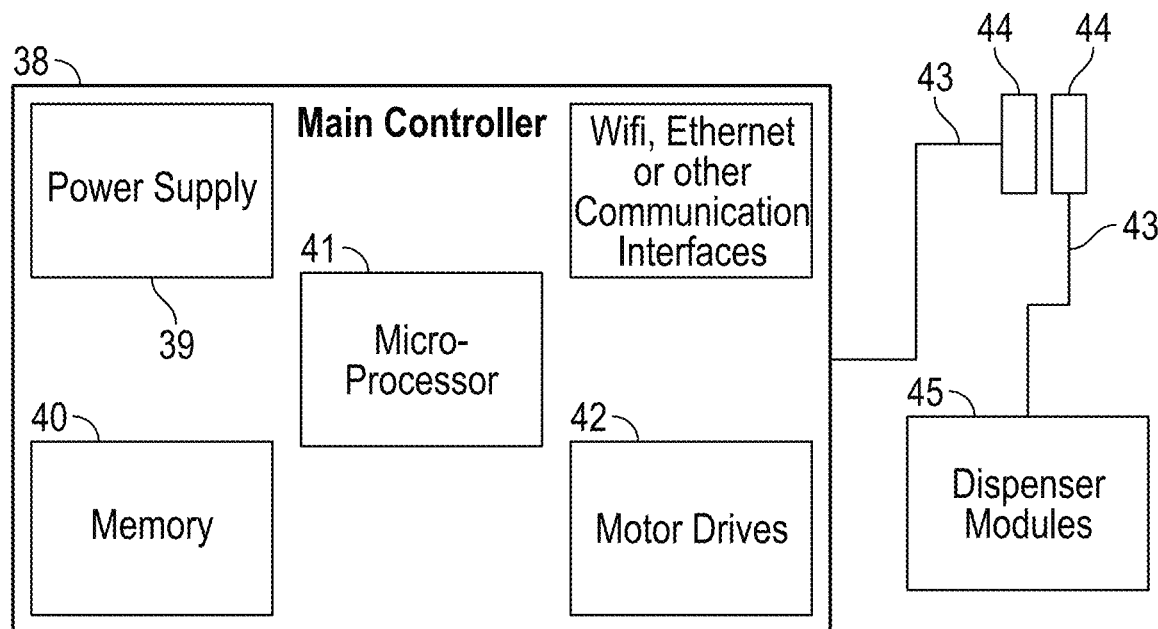
FIG. 13 shows a block diagram of an automated dispensing system.

FIG. 13 shows a schematic block diagram illustrating an example controller architecture that can be used with the dispensing system 9. The main controller 38 (which may include the structural and function features described in connection with controller 36) can house a power supply 39 to power all the modular dispensers, or dispenser modules, described herein (e.g., modular dispensers 10-16, 37, 45), a microprocessor 41 to process all algorithms or execute stored program instructions, memory 40 to store recipes and algorithms (e.g., program instructions, sequences, cleaning algorithms), and motor driver hardware 42 to control operation of the motor(s) in the modular dispensers 45. The main controller 38 is connected to the individual modular dispensers 45 thru electrical wire harnesses 43 with enough conductors to transmit power and communicate (e.g., two-way communications) with the modular dispensers 45. The harness 43 terminates in a sealed connector 44. The modular dispensers 45 have corresponding harnesses 44 and connectors to interface with the main controller 38. In other implementations, the communicative coupling may occur via wireless connection (e.g., Bluetooth, WiFi, or other wireless communication protocol connections).

The housing 18 may hold a common power supply and logic board separate from the individual modular dispensers 45. Each modular dispenser may simply connects to the common control system through an electrical connector. The modular dispensers 45 may be powered by a household plug in the country of use (e.g., 110 V or 220 V). The main controller 38 for the dispensing system also has a port for battery power, so that the system 9 can be run on battery, when the main power is shut down. Each modular dispenser 45 can be manually operated, for example hand cranked, to dispense ingredient in case of electronic malfunction or power outage (see FIG. 20).

In certain embodiments, the main controller 38 not only makes the individual modular dispensers 45 dispense as per the recipes, but also keeps track of the system 9 health and communicates with a remote server for recipe updates and software upgrades. The main controller 38 can also schedule cleaning of the individual modular dispensers 45 (e.g., based on the ingredient, based on an amount of ingredient dispensed, or based on a regular time schedule). The main controller 38 can be able to decode modular dispensers 45 running simultaneously as well as be able to use a plurality of communication channels to communicate to pump modular dispensers 45.

The main controller (or dispensing equipment controller) 38 of FIG. 13 has a Wi-Fi, Ethernet, and/or other communication interface to communicate with various devices (e.g., a remote server) over the Internet or other communications network to receive information on new recipes and software updates and also to transmit information on consumption of sauces and beverages being made to a remote server.

The main controller 38 can query the Wi-Fi or Ethernet access point in the location to find the store identity or location and store it in memory 40. This way, the main controller 38 can transmit store specific information to a remote server. Recipes, software updates, or other information can also be sent from the remote server to the memory 40 of the main controller 38 of the dispensing system 9.

The dispensing equipment can also maintain a digital version—the digital twin—of its functionality on a remote server. Changes to this digital twin can result in changes in software functionality in the main controller (dispensing system controller) 38.

More modular dispensers can be added to the automated dispensing system 9 by daisy-chaining several controllers (e.g., main controllers 38 or separate individual or group controllers) in series and connecting modular dispensers to them.

Location-specific dispensing algorithms can be incorporated into the dispensing controller (e.g., main controller 38). For example, a sauce dispense volume in one location could be half the dispense volume in another location.

In a simple manual mode, a barista can use the dispensing system 9 in FIG. 3. The number of pumps of the ingredient, modifier, or enhancer being dispensed or the volume of ingredient being dispensed is shown on the display 19 as in FIG. 4. Using the input device 20, the barista can toggle to decrease or increase the number of pumps (e.g., shots or doses) or volume being dispensed. When the barista has made the selection, a cup or other vessel is placed below the dispensing spout 21. The main controller 38 retrieves the algorithm for dispensation from its memory 40 and sends the power, dispense and display signals to the respective modular dispenser 45. The pump 28 in the modular dispenser 45 then dispenses the exact volume of ingredient into the vessel through the dispensing spout 21 when activated by the barista or upon detecting the vessel (e.g., upon detecting a vessel placed underneath the spout using a proximity sensor). Each actuation of a user input device (e.g., input device 20) may be equivalent to one dose or all the doses needed for that particular beverage recipe. Light indicators (e.g., light indicators in input devices 20 or light indicators, such as LED icons or indicators, on the display 20) may also alert the barista that the bag is empty or maintenance is needed. Audible alerts may additionally or alternatively be generated.

Figure 14:
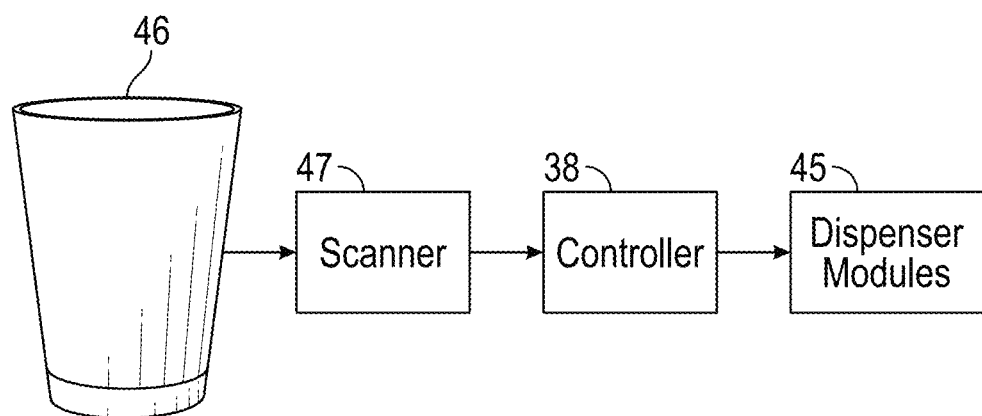
FIG. 14 shows a flow diagram of an automated mode of the automated dispensing system.

In the automated mode shown in FIG. 14, the barista scans in a bar code or QR code 46 (or other identification element, such as an alphanumeric textual label or NFC tag) through an optical or digital scanner 47. The identification element may be located, for example, on a cup or other vessel. The beverage information is then transmitted to the main controller 38 of the automated dispensing system 9. The main controller 38 retrieves the recipe from its memory 40 or from a remote server, and then supplies power and the appropriate dispensing algorithm to the modular dispenser 45 to dispense the right amount of ingredient(s) when activated by the barista or upon detecting the vessel positioned beneath the dispensing spout 21.

With reference to FIGS. 15A-15D, the barista can adjust the amount of the ingredient (e.g., syrup, sauce or flavor) based on the customer preference. For example, light indicators 120 integrated into the display 19 or positioned surrounding the display 19 (e.g., below, above, or to a side of the display 19) may show the number of pumps (e.g., shots or doses) of ingredients desired by the customer. For example, FIG. 15A shows one pump or dose as indicated by a slash in a first circle of the light indicators indicating that the light is lit up. FIG. 15B shows three pumps or doses (corresponding to three lit-up light indicators) and FIG. 15C shows seven pumps or doses (corresponding to seven lit-up light indicators), which is a maximum queue amount in the illustrated embodiment. However, other maximum pump (or dose) amounts may be implemented (e.g., fewer than seven or greater than seven as desired and/or required). The light indicators 120 or other indicator (e.g., alphanumeric LED indicator) may indicate the number of pumps to be dispensed automatically or may instruct the barista of the number of pumps to be dispensed manually. Each actuation of a user input device (e.g., input device 20) may be equivalent to one dose or all the doses needed for that particular beverage. As the doses are dispensed, the display 19 may decrease the number of remaining doses (e.g., by darkening or turning off a light indicator or decreasing a number value). With reference to FIG. 15D, one or more of the light indicators 120 may also alert the barista that the bag 25 in a tray 22 of a particular modular dispenser is empty or that maintenance is needed. For example, a first one of the light indicators 120 may be lit up with a different color (e.g., red color indicated by the filled-in dark first light indicator in FIG. 15D) to indicate that the bag is empty or that maintenance is needed. In some implementations, the light indicator may flash in addition or as an alternative to a different color. An audible, graphical, or textual alert may also be generated. A first light indicator may also be used to indicate power is on for the modular dispenser.

Figure 15E:
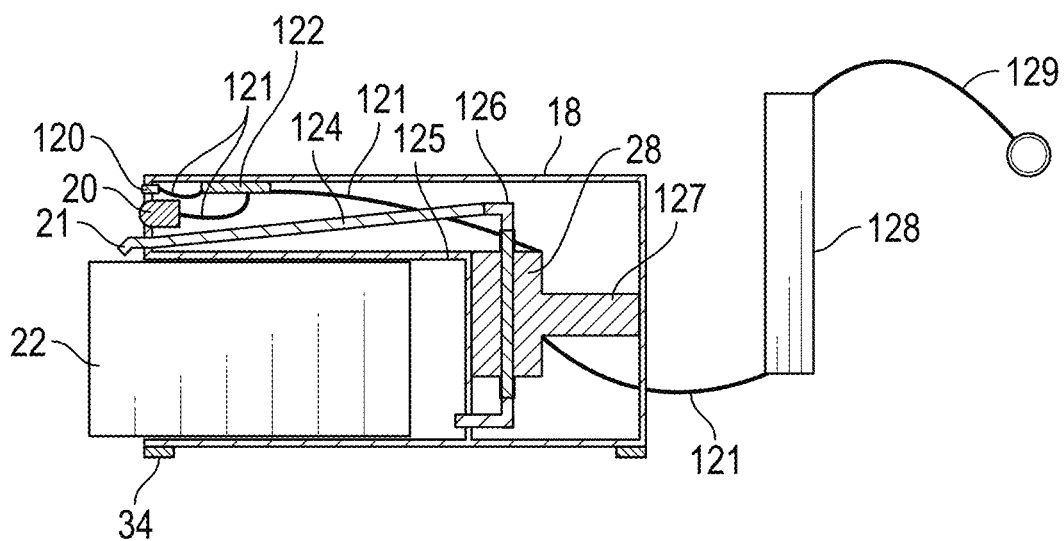
FIG. 15E shows a block diagram and partial side cross-section view of a modular dispenser, or dispenser module.

FIG. 15E shows a schematic side cross-section/block diagram of an embodiment of an individual modular dispenser 45 similar to that shown in FIGS. 15A-15D, although certain components may be repositioned in FIG. 15E. The modular dispenser 45 includes a housing 18 that houses internal components. A removable tray 22 can be inserted and removed from the housing 18 as described previously. The modular dispenser also includes a user input device 20 (e.g., press button) and/or display 19 (e.g., touchscreen display) and a dispensing spout 21 as previously described. The light indicators 120 (which may comprise 1, 2, 3, 4, 5, 6, 7 or more than 7 discrete light indicators) may be positioned as shown to be seen from a front side of the modular dispenser 45. The light indicators 120 may be positioned above or below the display 19 and/or user input device 20.

The modular dispenser 45 includes electronic circuitry (e.g., a printed circuit board assembly (PCBA)) configured to facilitate operation of (electrical connection or communication to and/or from) the light indicators 120, display 19, user input device 20. Power and/or data signals may be communicated between various components via wire harnesses 121. A supply line 124 facilitates transfer of contents from the tray 22 (or a bag 25 in the tray 22) to the dispensing spout 21. The supply line 124 may be comprised of separate sections connected by a tube fitment or coupler 126 (e.g., to help navigate sharp turns).

The modular dispenser 45 may include an access panel 125 that may be removed to access the pump 28 and/or pump motor 127 (e.g., DC motor) and/or supply line 124 for maintenance purposes. The motor 127 and/or pump may be electrically connected to a master power and logic housing 128 (e.g., main controller 38 or individual modular controller) configured to supply power signals and data communications to the modular dispenser 45 via a wire harness 121. The master power and logic housing 128 may be electrically coupled to a standard power socket or electrical outlet 129 on a wall of a coffee store. In some configurations, the power may alternatively or additionally be provided by a battery (e.g., rechargeable battery or replaceable battery) such that power can be maintained even during a power outage or to make the system more portable.

Figure 16:
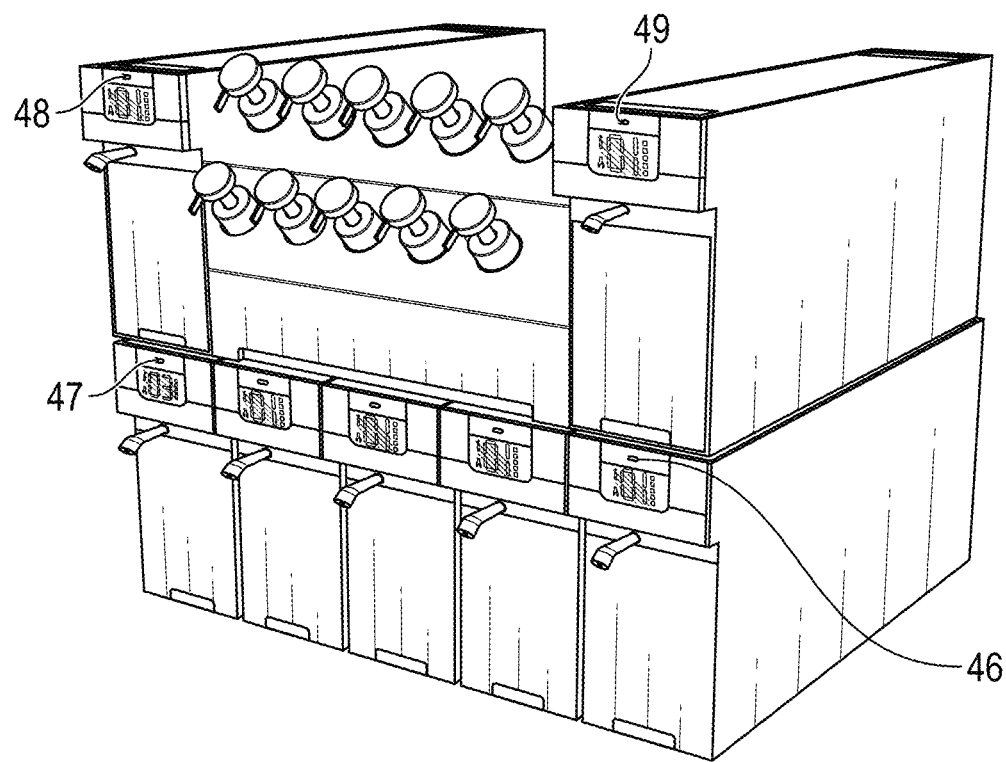
FIG. 16 illustrates an automated dispensing system with multiple modular dispensers.

With reference to FIG. 16, the automated dispensing system 9 can also prompt the barista to follow a particular dispensing sequence by lighting up display lights 46-49 (which are shown positioned within an area of the user input device 20) in a sequential manner. When a particular display light is on, the barista takes the cup to that modular dispenser to automatically or manually dispense ingredient (e.g., syrup, sauce or flavor) stored in that particular modular dispenser. Multiple baristas can work with the automated dispensing system 9 simultaneously, for example, by changing the color of the light or another aspect of the indicator (e.g., providing multiple different light indicators on each modular dispenser) for each separate order. That way, two or more baristas can be prompted on a beverage sequence at the same time.

Figure 17:
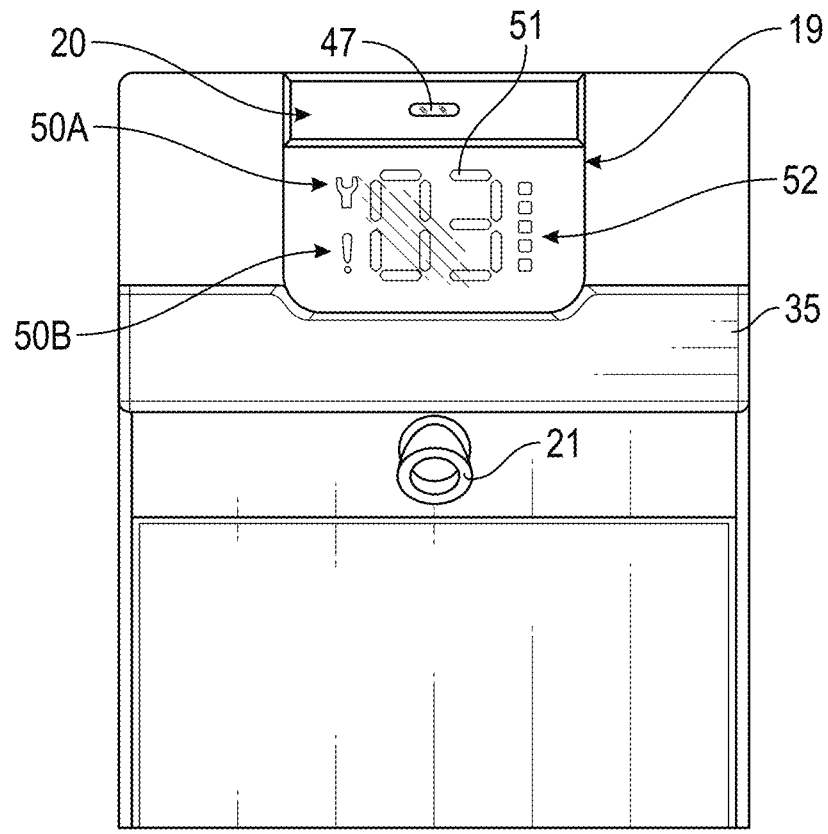
FIG. 17 illustrates a partial enlarged view of a user interface of an individual modular dispenser.

As shown in FIG. 17, the display 19 for the modular dispensers (e.g., any of modular dispensers 10-16, 37, 45) can have multiple icons or indicators to indicate different operational parameters. For example, a cleaning icon or indicator 50A may prompt a barista or other user that a cleaning cycle should be performed or is being performed. As another example, an error indicator 50B (illustrated as an exclamation mark as one example icon) may indicate that an error has occurred that requires attention (such as erroneous bag loading). As a further example, a third icon or indicator 52 may include a visual gauge or series of lights or other indicators to indicate an amount of ingredient (e.g., sauce, syrup or flavor) remaining modular dispenser in order to prompt the barista to change out the ingredient bag before it is depleted to avoid having to re-prime the supply line or pump. The display 19 may also include a numerical indicator 51 (e.g., alphanumeric LED indicator) to indicate a number of pumps, shots or doses to be dispensed (which can be adjusted by the barista) as described above by pressing the user input device 20.

Figure 18:
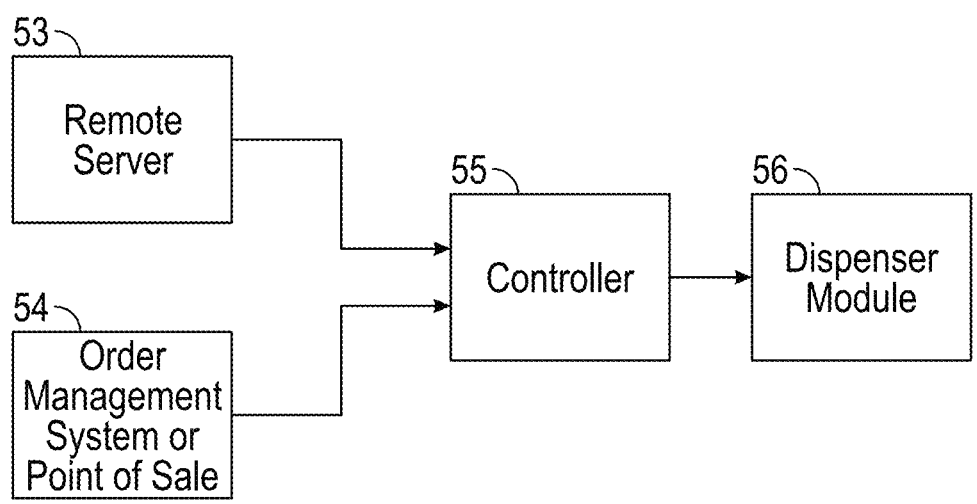
FIG. 18 shows a flow diagram of an automated mode of a dispensing system.

With reference to FIG. 18, the order of the dispensing sequence can also originate remote from the dispensing system 9. The order can originate in a remote server 53 or in an order management system or point of sale system 54 and communicated to the controller 55 (e.g., main controller 38) that can retrieve the recipe from memory (e.g., memory 40) and prompt the modular dispenser 56 (e.g., any of modular dispensers 10-16, 37, 45) to dispense an appropriate amount of ingredient (e.g., sauce, syrup or flavor).

Figure 19:
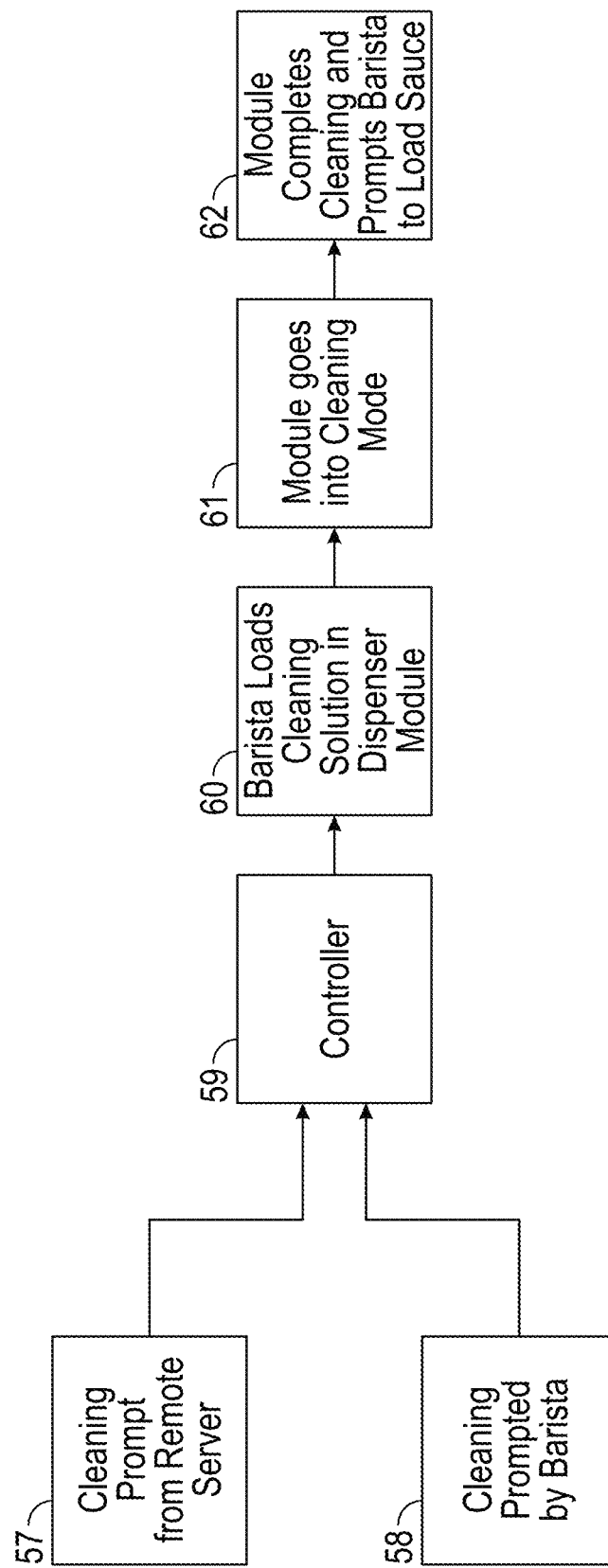
FIG. 19 shows a flow diagram for cleaning a modular dispenser.

In accordance with several embodiments, cleaning is an important part of the automated dispensing system 9 as this equipment is used to dispense food or beverage substances. Cleaning can be prompted in a timely manner (e.g., periodically according to a predetermined schedule or based on actual usage). FIG. 19 illustrates a schematic flow diagram of a cleaning process. The cleaning prompt can originate remotely at Block 57 (e.g., from a remote server) or from a controller (e.g., main controller 38, controller 55) at Block 59 or the cleaning prompt can also be manually initiated by the barista at Block 58. The controller can send an individual modular dispenser a prompt or instruction to display the cleaning icon 50A on the display at Block 59. The barista then loads a cleaning solution in the dispenser tray (e.g., tray 22) at Block 60 and directs (e.g., by pressing a user input) the modular dispenser to go into a cleaning mode at Block 61. In some implementations, the cleaning mode may be entered automatically upon loading of the cleaning solution and pressing the tray back into modular dispenser. The modular dispenser completes the cleaning cycle and prompts the barista to reload the ingredient at Block 62. The capability to have a cleaning cycle for each individual modular dispenser without any disassembly of the equipment is useful as each ingredient may have different cleaning requirements. In addition, the other modular dispensers connected to the dispensing system 9 may still be used while one or more modular dispensers are being cleaned.

Figure 20:
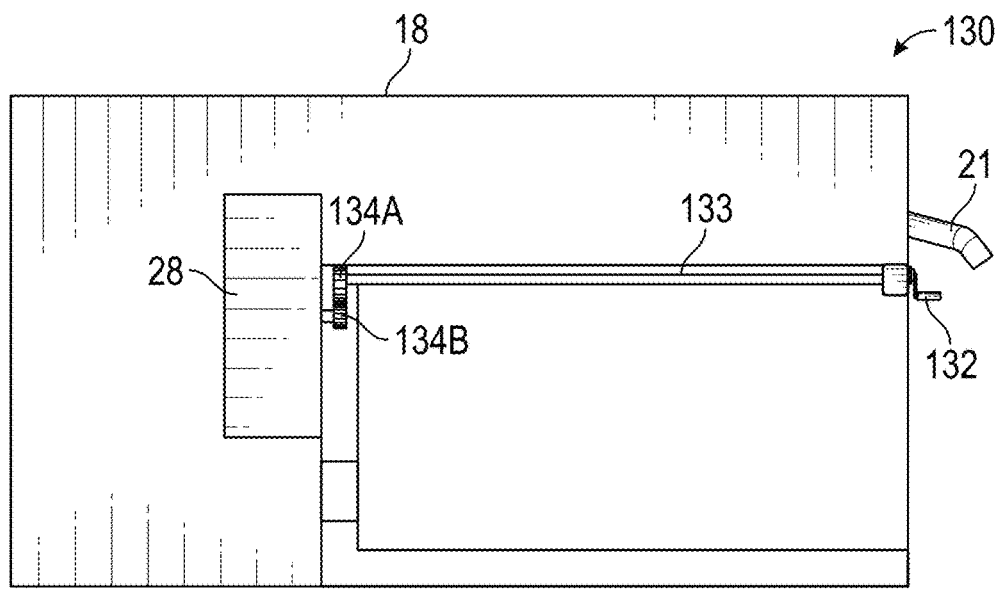
FIG. 20 shows a block diagram of a manually operable modular dispenser.
Figure 21:
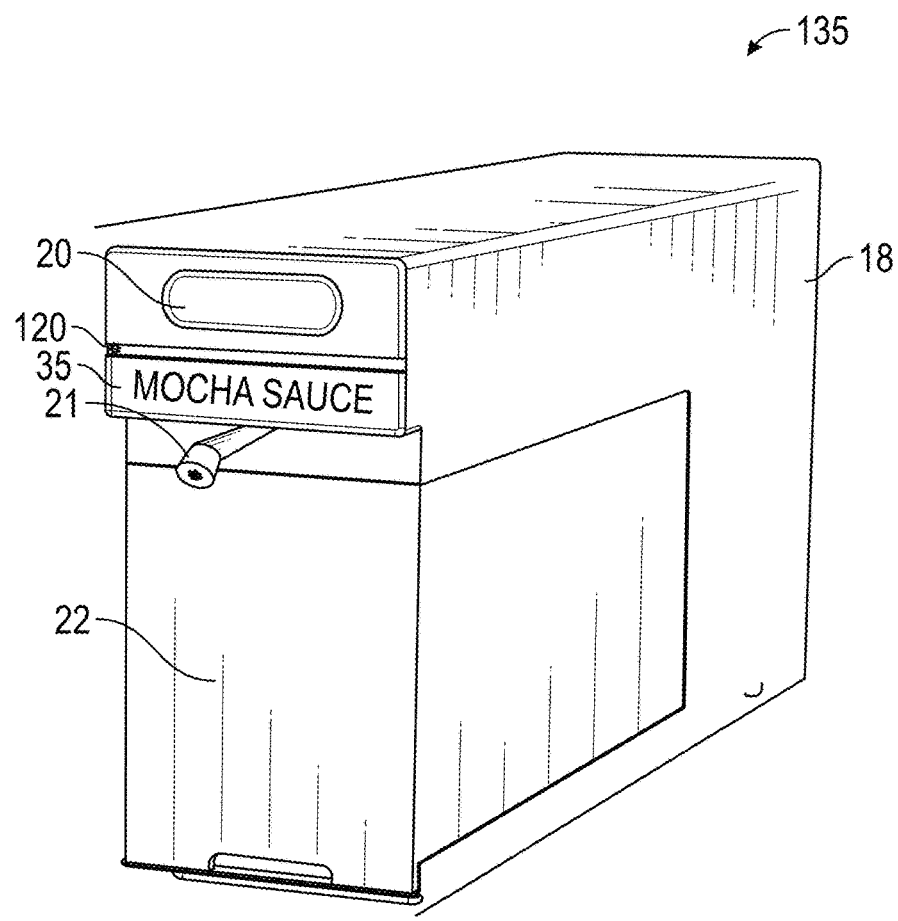
FIG. 21 illustrates a modular dispenser, or dispenser module, that may be used with the automated dispensing systems.
Figure 22:
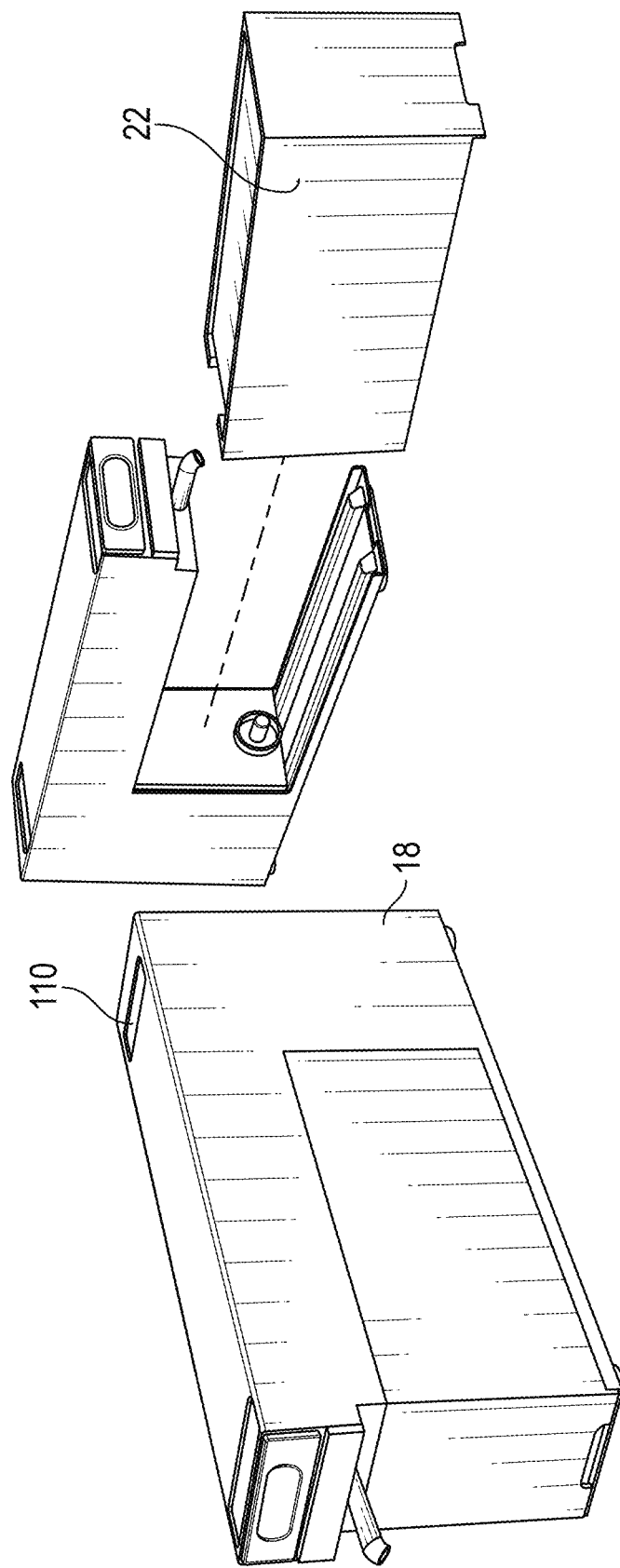
Figure 23:
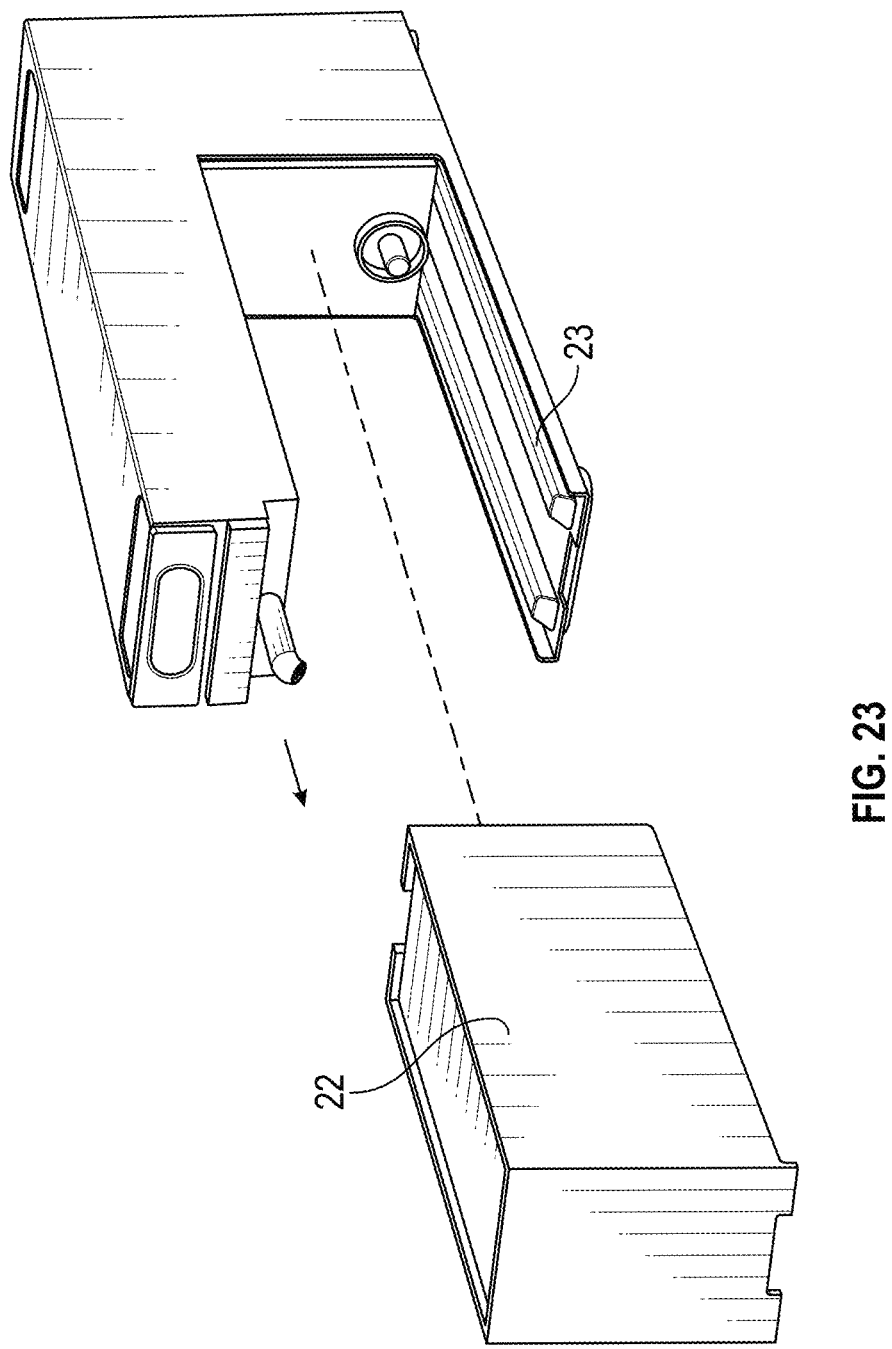
Figure 25:
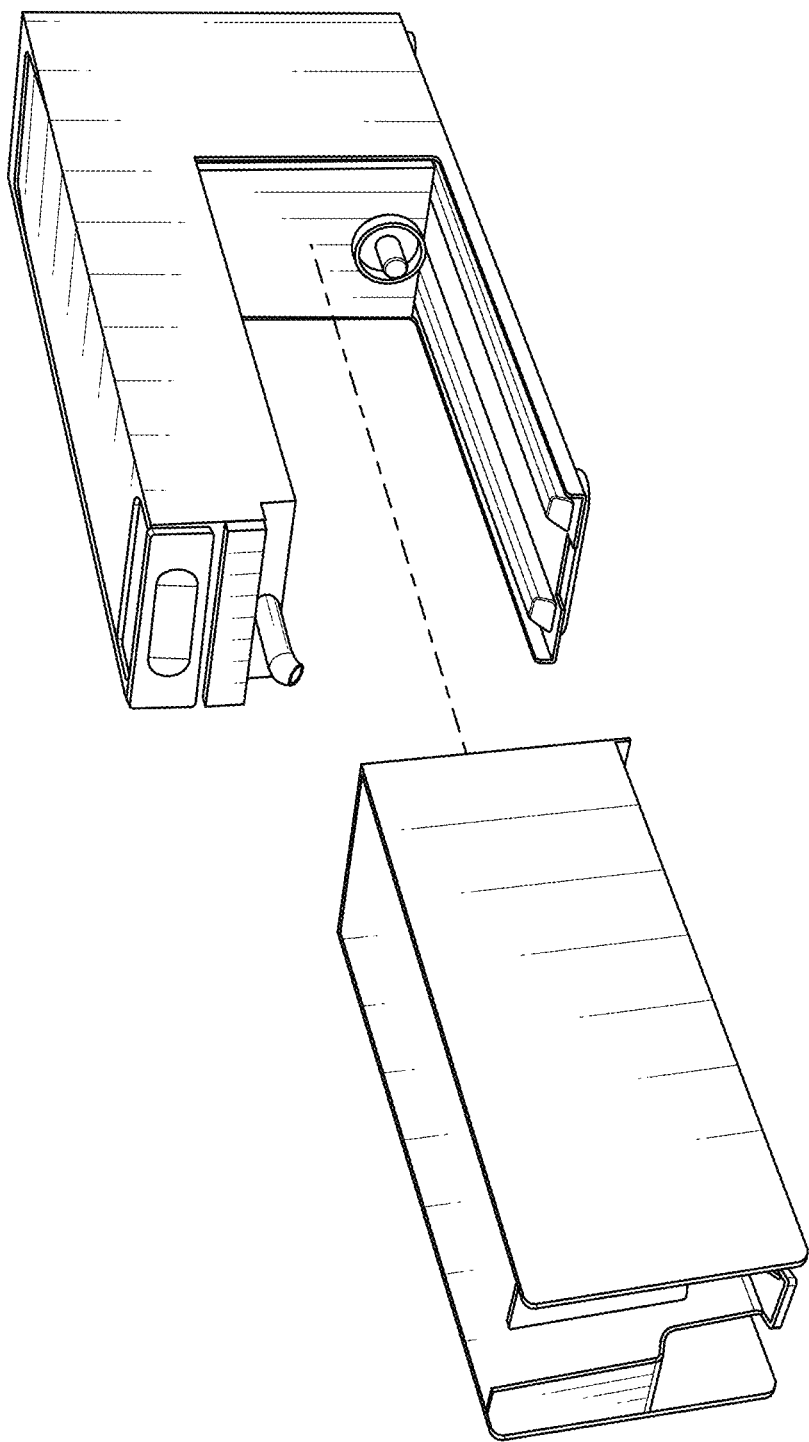

FIG. 20 shows a block diagram of a manually-operable modular dispenser 130. The manual operation may be incorporated into any of the modular dispensers described herein. The manual operation mechanism comprises a ratcheting system that includes a hand crank 132 that is operably coupled to a drive shaft 133. Rotation of the hand crank 132 causes corresponding rotation of the drive shaft 133. The drive shaft 133 is mechanically and operably coupled to one or more gears. Rotation of the drive shaft 133 may rotate a first gear 134A attached to the drive shaft 133. The first gear 134A may be mechanically and operably coupled to a second gear 134B that in turn is mechanically and operably coupled to a motor/pump assembly of the modular dispenser 130. The hand crank 132 may be located at various locations (e.g., a front surface of the housing 18 below or adjacent the dispensing spout 21). The manual operation mechanism may advantageously facilitate operation of the modular dispenser 130 even when power is lost. Other manual operation mechanisms may be implemented as well (e.g., more than two or fewer than two gears).

Figure 26:
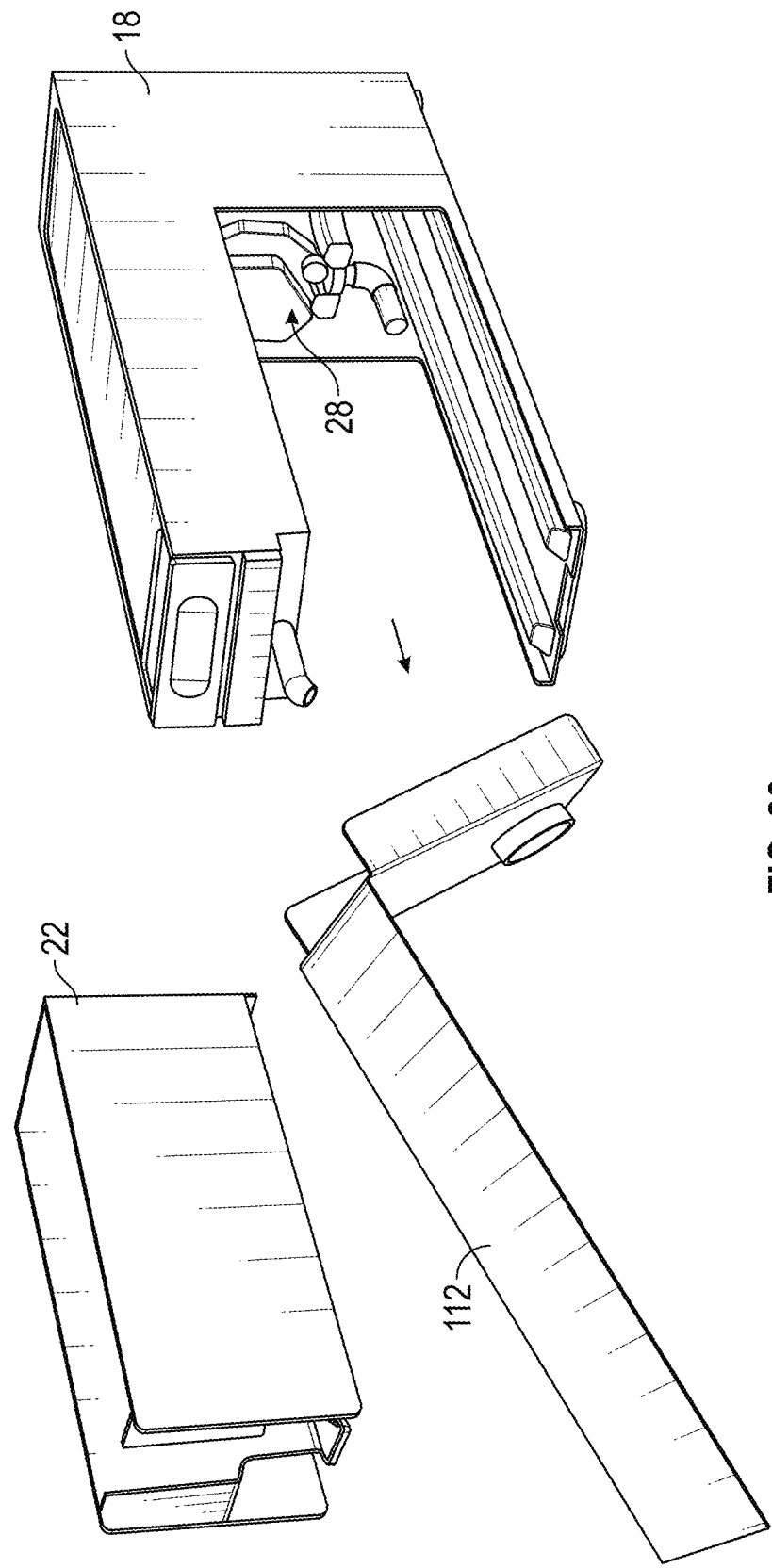

FIGS. 21-27 illustrate another embodiment of a modular dispenser 135 without a display screen 19. The modular dispenser 135 may include structural and functional features similar to the modular dispensers described herein (e.g., housing 18, a user input device 20, a dispensing spout 21, a tray 22, guiding features 23, pump 28, a label plate 35, light indicators 120). The tray 22 may include similar tray features as described herein (e.g., pull feature 24, bag 25, valve 26, locating feature 27, drip catch feature 111). The modular dispenser 135 may include a simplified user interface that includes an enlarged user input device 20. As shown in FIGS. 26 and 27, the pump frame 112 (e.g., an access panel of the pump frame 112) may be removed to access the pump 28 for maintenance.

FIGS. 28A-28D schematically illustrate a sample workflow or operation and show an example embodiment of an aggregator 63 that can be incorporated into or can be communicatively and operably coupled to the automated dispensing systems 9 described herein. The aggregator 63 may be configured to efficiently process customer orders to facilitate high throughput while maintaining quality control and accuracy of customer orders communicated to the automated dispensing system.

Figure 28A:
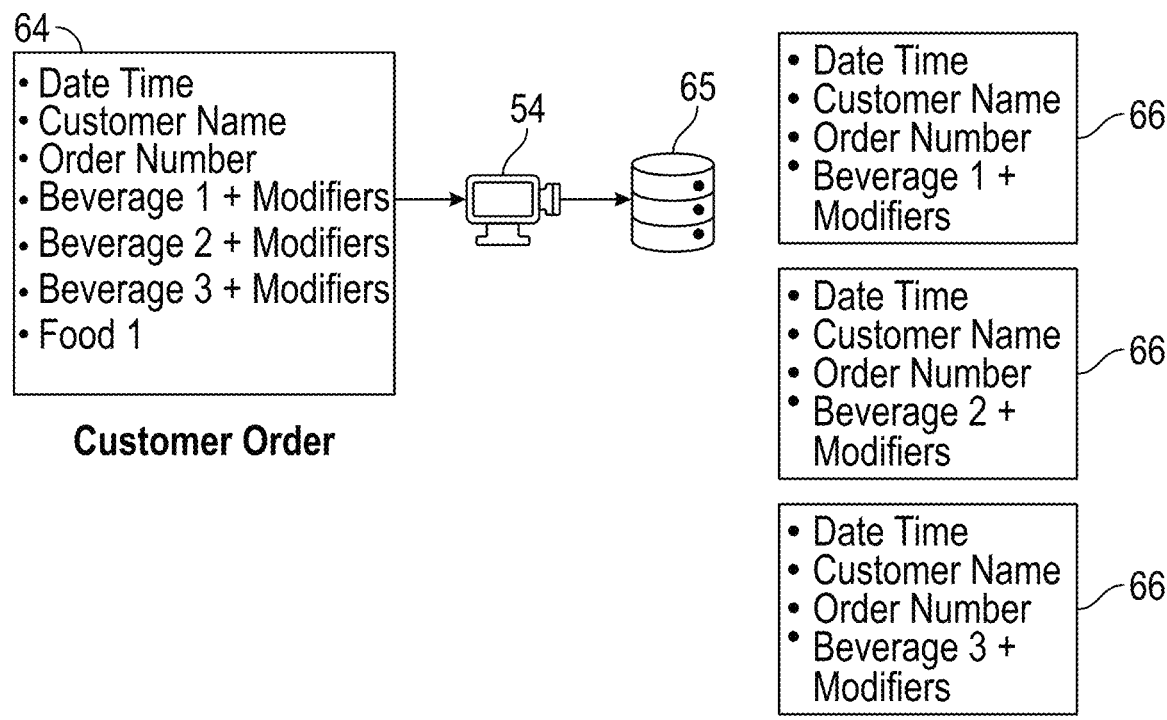
FIGS. 28A-28D schematically illustrates an aggregator of an automated dispensing system and operation of an aggregator.

With reference to FIG. 28A, customer orders may be received by the order management or point of sale system 54 from (1) a barista entering a customer order locally at a coffee store in response to oral instructions from a customer ordering at an in-store counter or via a drive-thru ordering system, (2) a customer entering a customer order locally via an in-store self-service kiosk, (3) a customer using a mobile order and pay software application, (4) a customer using an online ordering method, and/or other source. FIG. 28A shows an example customer order 64 and example data or information that may be captured and received by the point of sale system 54. The customer order information may include, for example, a date, time, customer name, and the beverage and/or food items ordered by the customer, along with any modifiers or ingredients (e.g., flavors, sauces, or syrups, or reduction of sugar).

The point of sale system 54 may then send the customer order data or information to a server or store production controller 65. The server or store production controller 65 may be located in the coffee store and may be communicatively coupled to the point of sale system 54 via a communication cable (e.g., Ethernet cable) or via a wireless connection (e.g., Wi-Fi connection via a wireless network such as a local area network or a Bluetooth connection). In some implementations, the server or store production controller 65 may not be located in the coffee store and may be located at a remote location (e.g., a remote server) and communicatively coupled to the point of sale system 54 via a telecommunications network (e.g., the Internet, Telex network, wireless radio network, etc.).

The store production controller 65 is configured to, upon execution of instructions stored on a non-transitory storage medium, disaggregate the customer order data into separate, individual food or beverage item orders 66. Each individual item order 66 includes a customer order number, a customer name, a name of the food and/or beverage items, and a list of any requested modifiers or ingredients (e.g., sauce, syrup, flavor, or reduction of sugar) for each food and/or beverage item.

Figure 28B:
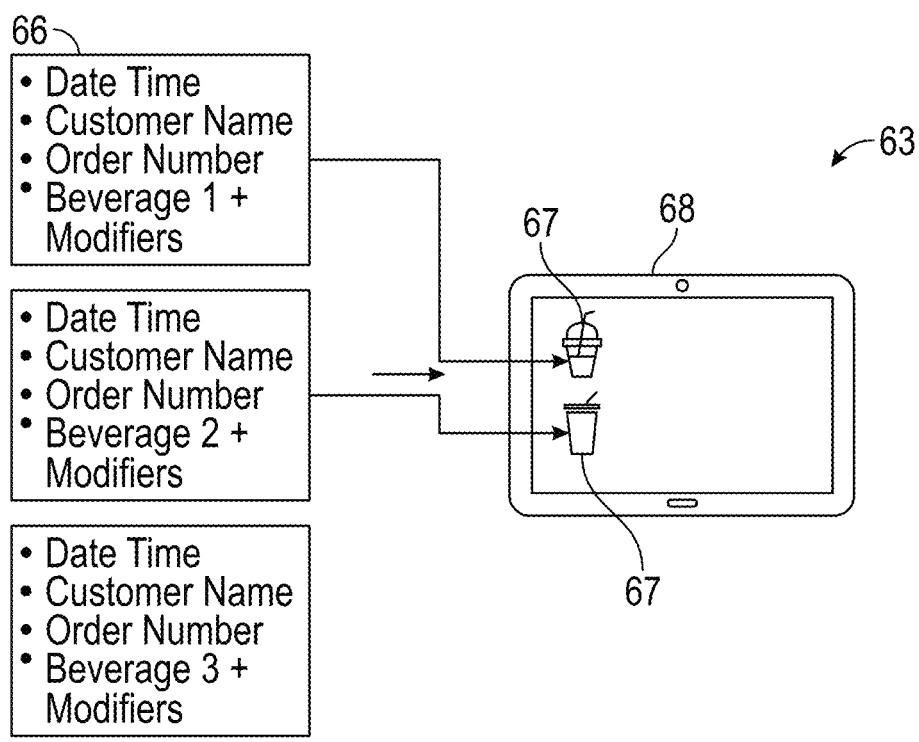

With reference to FIG. 28B, each disaggregated individual item order 66 is sent to the aggregator 63 in sequence. In several implementations, the individual item orders 66 may be published as webhooks (e.g., messages or notifications with information sent between network resources). The aggregator 63 includes software instructions stored in memory that are executed to cause an icon 67 associated with each individual item order 66 (at least the beverage item orders) to appear on a display screen 68 of the aggregator 63. The icons may be customized to look like particular beverages or types of beverages.

Figure 28C:
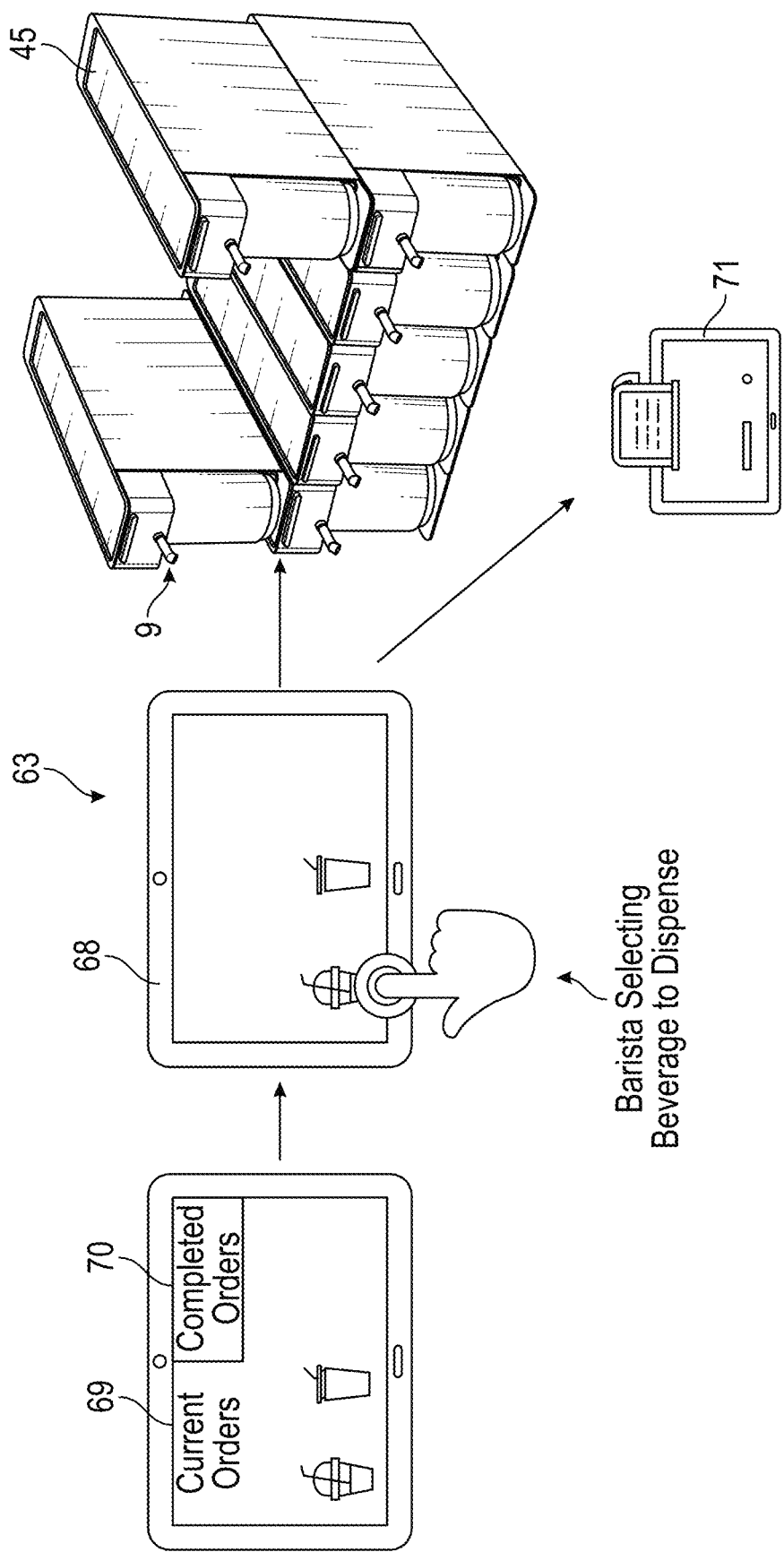

Turning to FIG. 28C, the display screen 68 may comprise a touch screen display (e.g., LCD or OLED display) that allows a barista or operator to both visualize output on the display screen 68 and to provide input to cause the aggregator 63 to send control signals to the modular dispensers (e.g., modular dispensers 10-16, 37, 45, 56, 135) of the automated dispensing system 9 (e.g., to the main controller 38, 55). For example, a barista may select a beverage to be made by touching the display screen 68 at the location of the icon 67 corresponding to the beverage with his or her finger. The display screen 68 may be configured to have two pages or tabs. A first page or tab 69 may be configured to display pending customer orders and a second page or tab 70 may be configured to display completed orders. A barista may toggle between the two tabs using the touch screen display or a user input device (e.g., button).

Upon selection of an icon by the barista, the aggregator 63 is configured to send the beverage item data or information (e.g., beverage name and ingredients or modifiers) corresponding to the selected icon to the modular dispensers 10-16, 37, 45, 56, 135 (e.g., to the main controller 38,55 of an automated dispensing system 9 including the modular dispensers 10-16, 37, 45, 56, 135). The main controller 38,55 may then execute instructions to prepare the beverage based on the beverage item data or information received from the individual beverage item order 66 and based on recipe information for the particular beverage stored in memory (e.g., memory 40). The aggregator 63 may also send the beverage item data or information for each individual item order 66 to a label printer 71 (e.g., which may be communicatively coupled via a wired or wireless connection, such as Ethernet, Wi-Fi or Bluetooth connection) so that a label can be automatically printed with the individual item order information and placed on a beverage cup or other vessel.

Figure 28D:
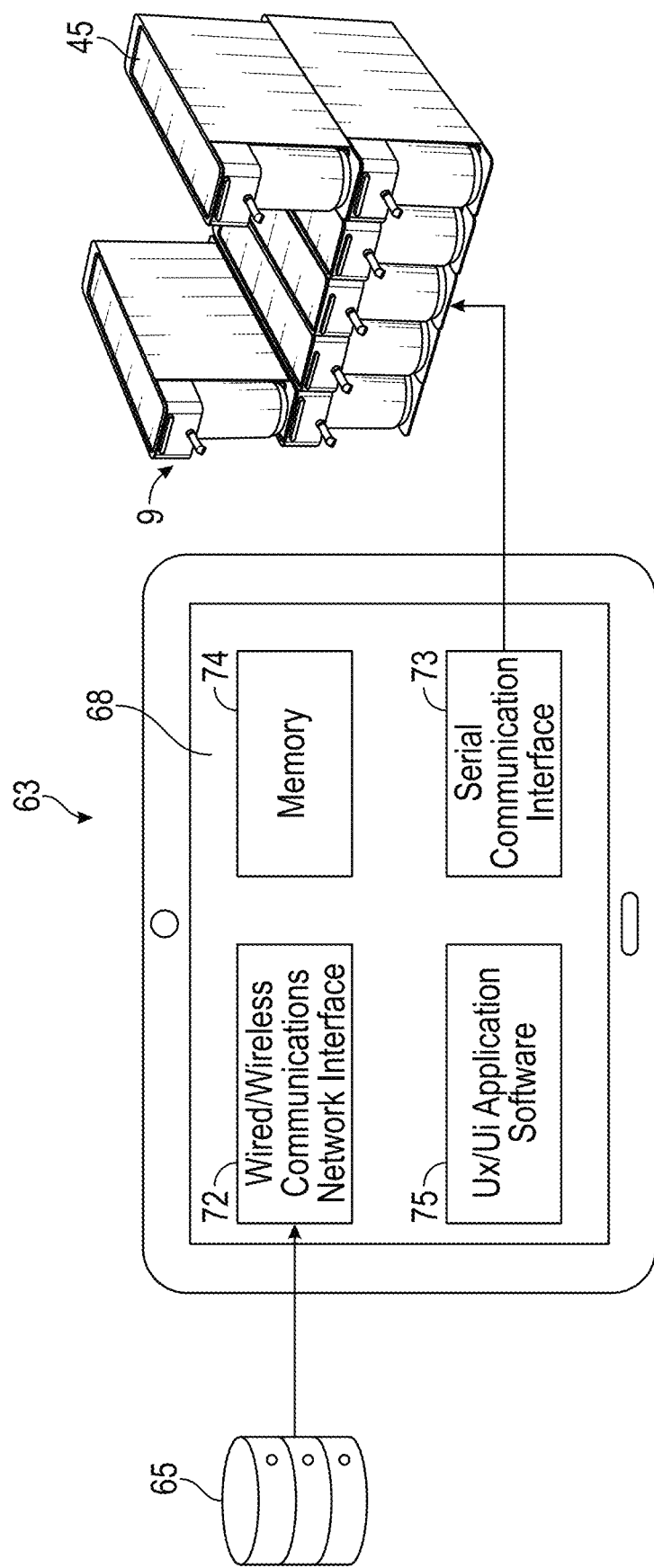

With reference to FIG. 28D, the aggregator 63 is a standalone unit or module having its own local processor or controller, memory, and display. The aggregator 63 may be implemented using hardware, software, and/or firmware. The aggregator 63 includes communications network interface hardware 72 (e.g., a wired Ethernet network interface card and/or one or more wireless network interface cards, such as a Wi-Fi and/or Bluetooth network interface card) to enable wired and/or wireless communications with the store production controller 53 or a remote server. The aggregator 63 also includes serial communications interface hardware 73 to facilitate one-way or two-way communication (e.g., data transmission, control signals) with the main controller 38,55 of the automated dispensing system 9 over a serial bus link. A parallel bus link may be used in alternative embodiments.

The aggregator 63 further includes local memory 74. The local memory 74 may store a backup copy of beverage recipes for the automated dispensing system 9 and may store firmware of the aggregator 63. The local memory may include, for example, RAM memory, flash memory, ROM memory, EPROM memory, EEPROM memory, and/or the like. The aggregator 63 may include user experience/user interface software 75 stored in memory to be executed by one or more processors (e.g., digital signal processor, microprocessor, graphics processing unit, special-purpose processor). The user experience/user interface software 74 may be executed to generate icons for display on the display screen 68 corresponding to various beverages, to generate the two pages or tabs of pending orders and past orders, to react to touch screen input received from the barista, and to display and adjust content on the display screen 68 (e.g., display brightness, alerts, notices, etc.).

Figure 29B:
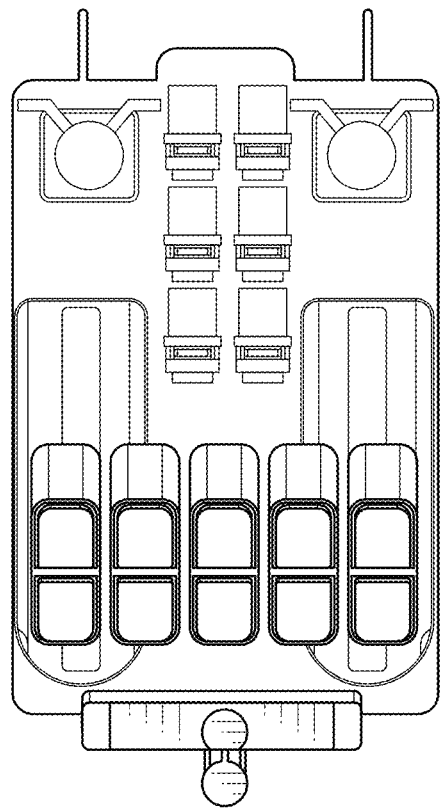
FIGS. 29A-29C illustrate a front view, top view, and side view of an automated dispensing system that may be used in connection with an aggregator.
Figure 29C:
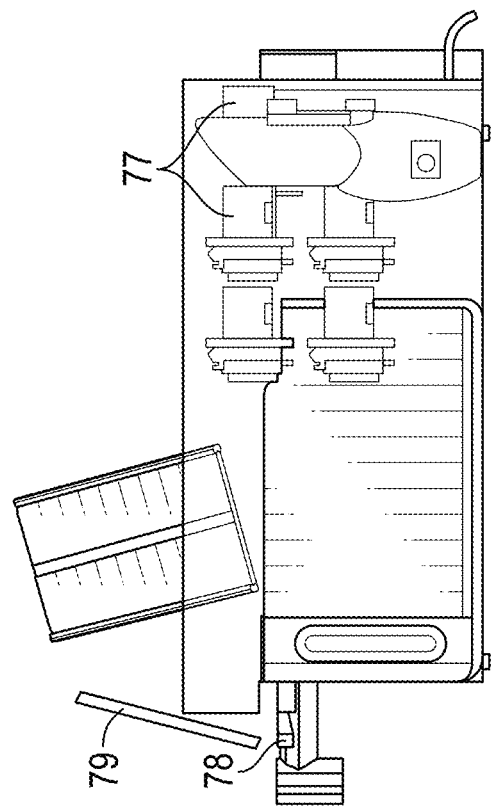
Figure 29A:
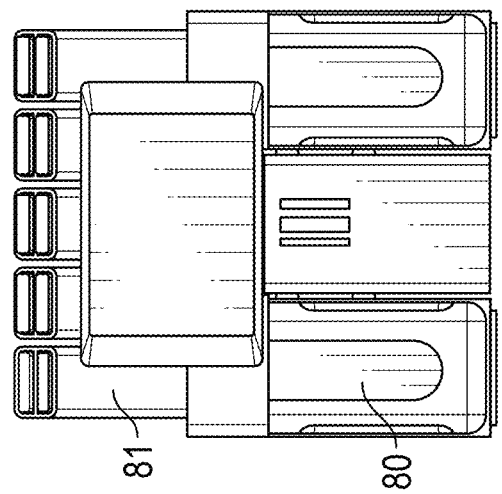

Turning to FIGS. 29A-29C, in accordance with several embodiments, an automated modular dispensing system or unit 76 (e.g., automated dispensing systems 9 described herein) can advantageously comprise a system or unit adapted and configured to aggregate ingredients or modifiers (e.g., sweetener, flavor and color) simultaneously. FIGS. 29A-29C show a front, top and side view, respectively, of the modular dispensing system 76. The modular dispensing system 76 comprises a series of pump and motor assemblies 77, supply lines 78, a display 79, sweetener, sauce or syrup cartridges 80 and color or flavor concentrate cartridges 81. The pump and motor assemblies 77 may be various sizes and can be combined to create endless combinations and permutations of customized beverages. The size of the pump may be dependent, for example, on a liquid viscosity and a desired dose of the ingredient or modifier.

Figure 30:
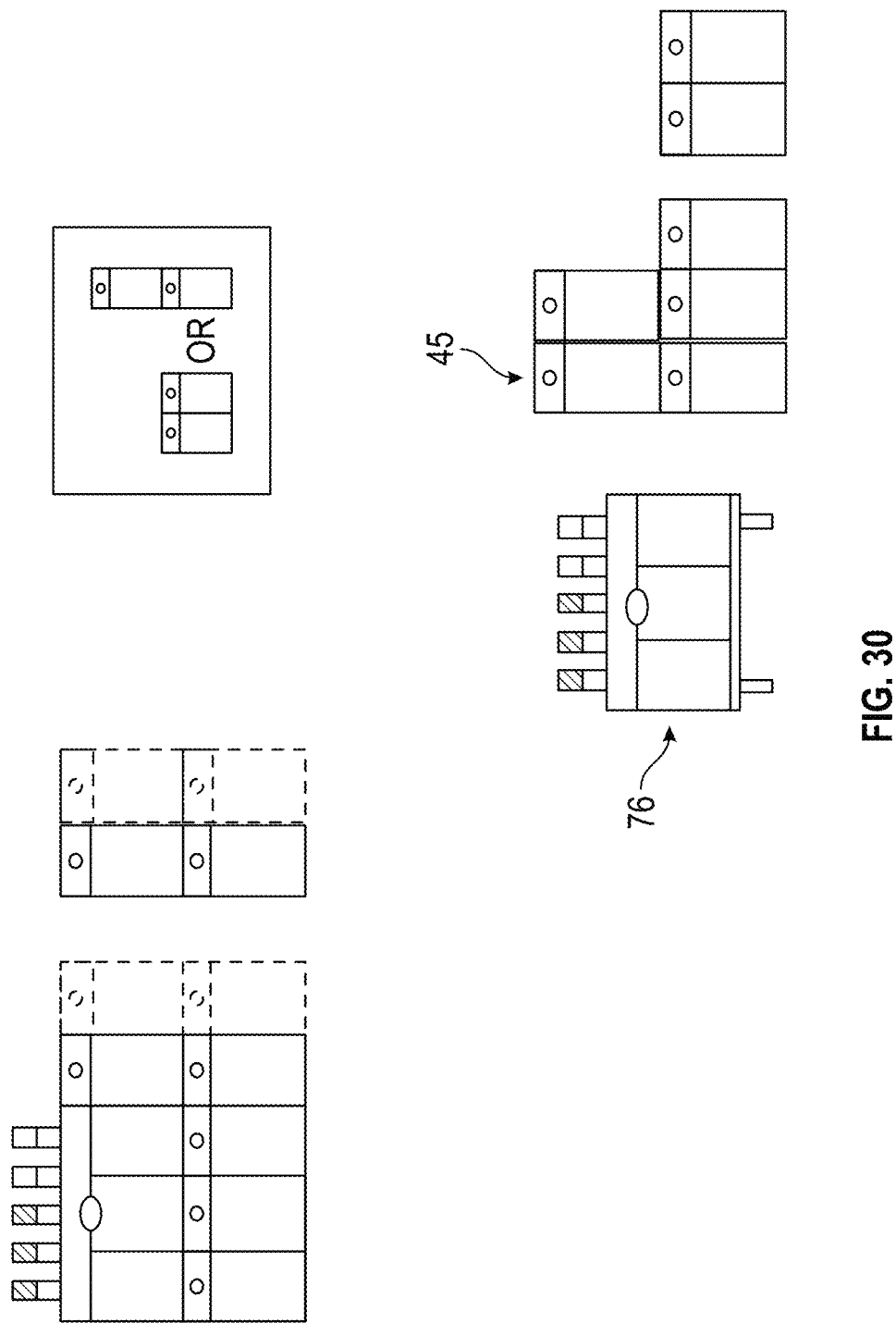
FIG. 30 illustrates various examples of modular configurations of an automated modular dispensing system including multiple dispenser modules.

With reference to FIG. 30, the modular dispensing system or unit 76 can work independently or in series with other modular dispensers (e.g., modular dispensers 10-16, 37, 45, 56, 135) described herein. FIG. 30 show various configurations of modular systems in which modular dispensers may be stacked vertically and/or placed horizontally adjacent to each other (e.g., depending on a particular space or area of a coffee store and surrounding equipment). The system is adaptable and modular to suit the needs or desires of a particular coffee store manager or baristas.

Figure 31:
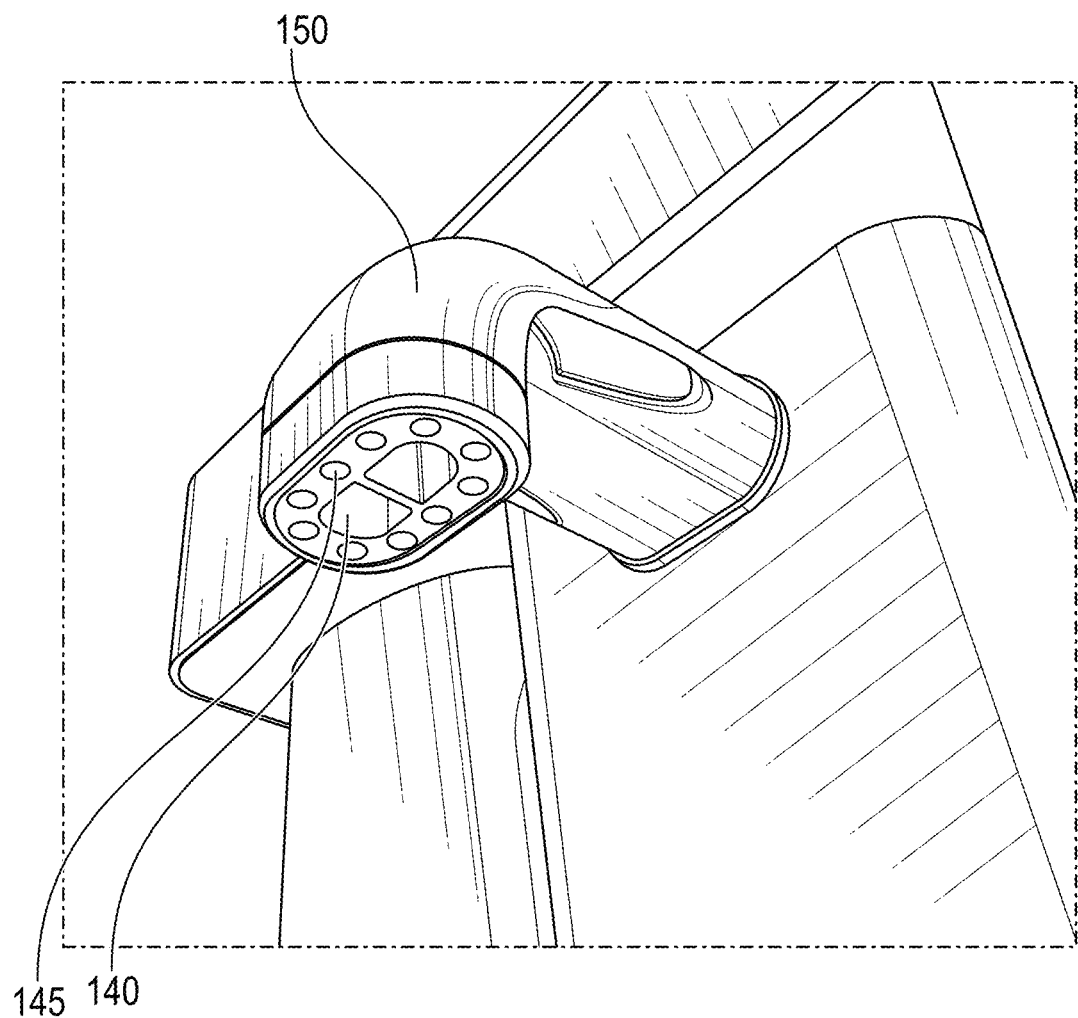
FIG. 31 illustrates a close-up perspective bottom view of a central dispenser spout of an automated dispensing system.

When the modular dispensing system 76 is connected to a motherboard or centralized processing unit (e.g., main controller 38), the modular dispensing system 76 can advantageously prepare any color drink via color or flavor concentrate cartridges 81 of any or all of the primary colors or most common coffee or tea beverage colors. Additionally, endless flavor mixing profiles are possible when connected to the motherboard or centralized processing unit (e.g., main controller 38). The flavors are dispensed simultaneously and dispense at a single point (e.g., a central dispenser spout 150), as shown in FIG. 31. The central dispenser spout 150 may be fluidically coupled to one or more of the dispenser modules, or modular dispensers. As shown, the central dispenser spout 150 may include multiple outlet orifices to facilitate simultaneous delivery of ingredients or modifiers (e.g., syrups, sauces, flavors, color concentrates, sweeteners) along with a base beverage. Larger central outlets 140 may facilitate delivery of the base beverage (including water) into a cup or other vessel and smaller outer outlets 145 may facilitate delivery of the ingredients or modifiers. As one example, smoked flavor plus caramel syrup may result in a customized smoked caramel coffee beverage. The modular dispensing system 76 may incorporate any or all of the structural and functional components and features of the dispensing systems 9 described herein, and vice-versa.

Figure 32:
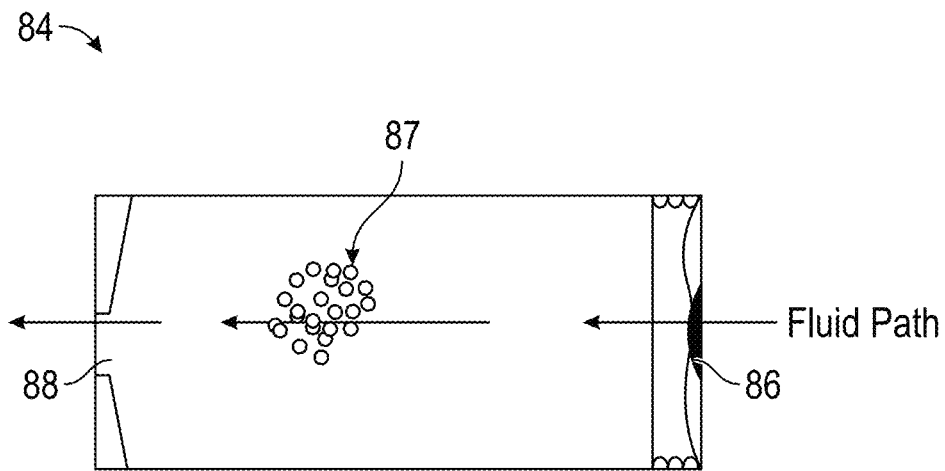
FIG. 32 schematically illustrates operation of a granular cleaning cartridge with a valve that can be used to facilitate cleaning of the dispenser modules of the automated dispensing system.
Figure 33:
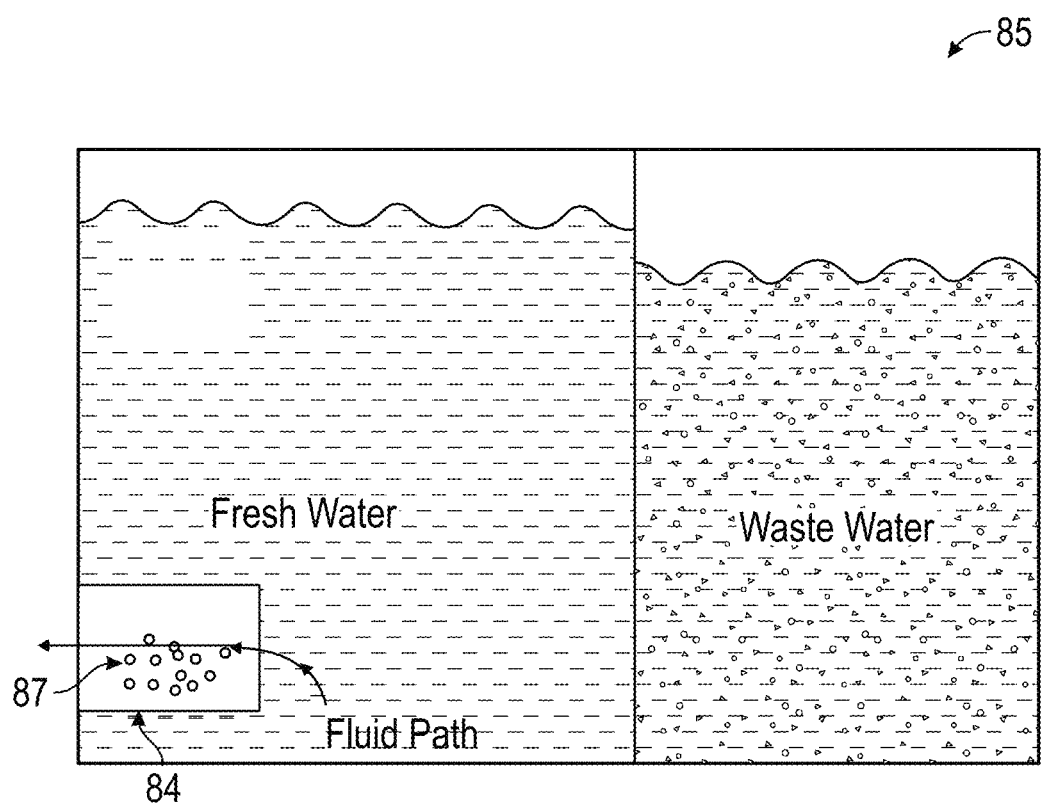
FIG. 33 illustrates an example implementation of a cleaning tray or cartridge that can be inserted into a dispenser module to facilitate cleaning.
Figure 34:
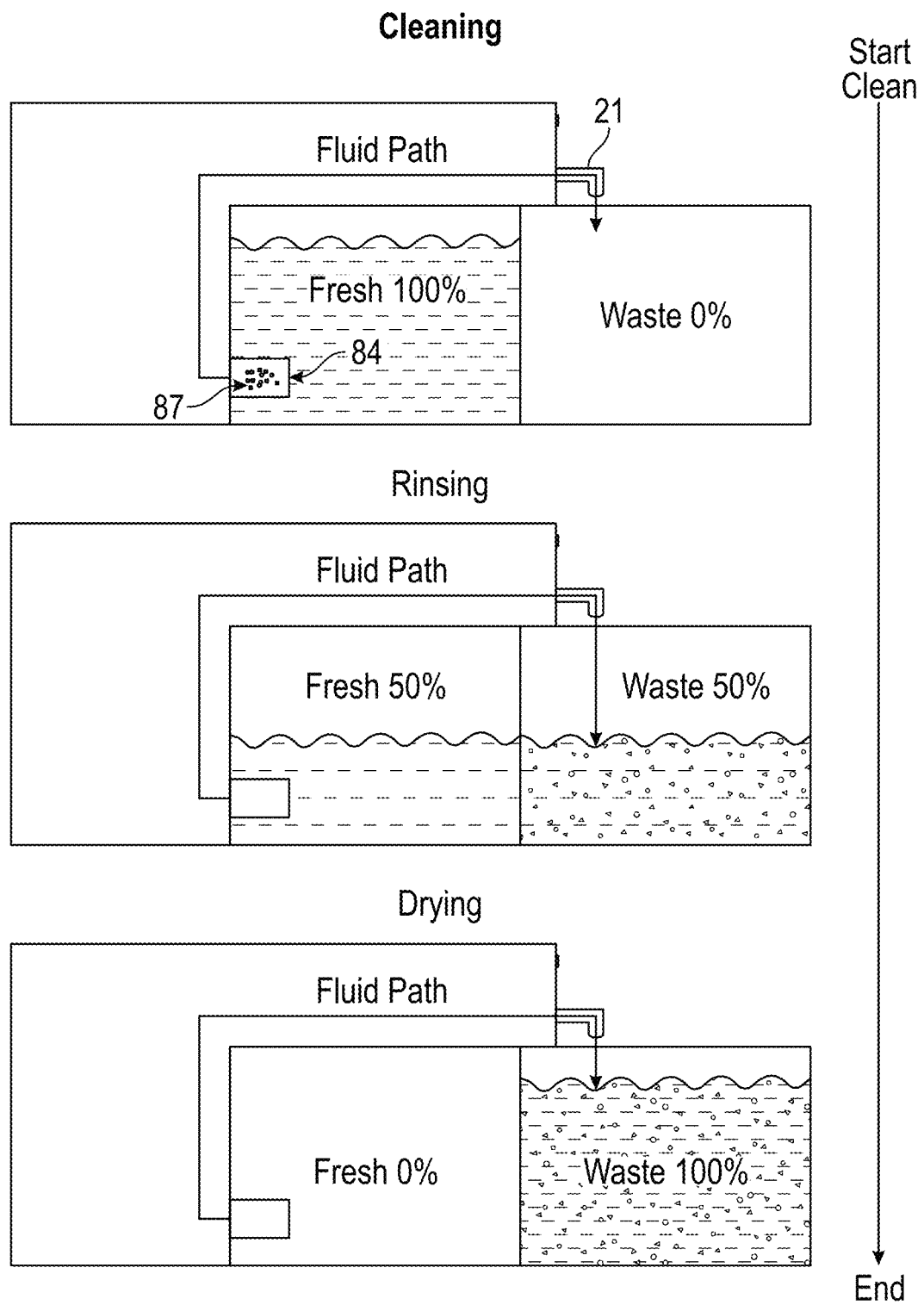
FIG. 34 schematically illustrates a cleaning operation that may include a cleaning cycle, a rinse cycle and a drying cycle.

FIGS. 32-34 schematically illustrate cleaning configurations or implementations of the automated modular dispensing systems 9, 76. With reference to FIGS. 32 and 33, the dispensing systems 9, 76 may be cleaned using an automated process utilizing a granular cleaning cartridge 84 (schematically illustrated in FIG. 32) and a designated cleaning tray 85 (schematically illustrated in FIG. 33). The granular cleaning cartridge 84 is refillable and includes a one-way fluid flow path as illustrated. The granular cleaning cartridge 84 includes a one-way inlet valve 86 at an inlet end of the granular cleaning cartridge 84. An outlet end of the granular cleaning cartridge 84 may include a female fitment 88 for a male probe or tubing fitment/connector to transport cleaning solution out of the granular cleaning cartridge 84 and through tubing or supply lines of the pumping assembly and then out the dispenser spout 21. Granular cleaning product 87 may be inserted within the granular cleaning cartridge 84. The granular cleaning product 87 may be concentrated as required and/or desired by a unit volume and/or sanitation target.

Turning to FIG. 33, the designated cleaning trays 85 may comprise a two-compartment system or unit, with one compartment or chamber for clean (or fresh) water and one compartment or chamber for waste water. The two compartments or chambers may be physically and fluidically isolated from each other to avoid contamination. The granular cleaning cartridge 84 is configured to be positioned inside the clean water compartment or chamber of the cleaning tray 85. The granular cleaning cartridge 84 may be mechanically coupled to an outlet mechanism of the cleaning tray 85.

The cleaning trays 85 may be sized and adapted to be inserted after removal of an ingredient tray 22 from a modular dispenser 45. When the cleaning trays 85 are correctly inserted into the modular dispenser 45, a sensor and/or switch of the modular dispenser 45 may recognize or detect the cleaning tray 85 as a unique or dedicated cleaning tray instead of an ingredient tray 22 to prevent a barista from accidentally serving cleaner to a customer. The sensor and/or switch may also trigger a "clean mode" activation option on the display screen of the dispenser module. With one touch press of button (e.g., user input device 20), a barista may turn on, or activate, cleaning.

FIG. 34 schematically illustrates an embodiment of a cleaning cycle using the granular cleaning cartridge 84 positioned in a designated cleaning tray 85. The cleaning cycle starts with all of the water in the fresh water compartment or chamber. As the cleaning cycle proceeds, enough fresh, clean water may flow through the granular cleaning cartridge 84 (which includes the granular cleaning product 87) to create a desired cleaning solution and then into the modular dispenser unit 45 (e.g., through the pump and tubing (e.g., supply lines) of the pump assembly) for cleaning. The fluid then exits the dispenser spout 21 of the modular dispenser 45 and into the waste water compartment or chamber of the cleaning tray 85. After a certain period of time (e.g., after about 50% of the fresh water in the fresh water compartment chamber has been drained out), the granular cleaning product 87 is depleted and any remaining fresh, clean water may flow through the modular dispenser unit 45 as part of a rinsing cycle (as shown in the middle figure of FIG. 34). Eventually, all the liquid may end up in the waste water compartment or chamber of the cleaning tray 85 (as shown at the bottom of FIG. 34), which triggers an end of a cleaning cycle and a beginning of a dry cycle. A barista may then be prompted (e.g., via a textual prompt or graphical icon on the display or via an indicator light) to remove the cleaning tray 85 and replace it with a new ingredient tank 22.

Although certain embodiments have been described herein in connection with flavors, sauces, or syrups for coffee or tea beverages, the systems described herein can be used for any type of ingredient or food product. For example, in some embodiments, the systems herein can be used to deliver fluid or solid ingredients, such as ketchup, mustard, barbecue sauce, cheese sauce, relish, onions, etc. In some embodiments, the systems herein can be used to produce other types of beverages such as sodas, juices, smoothies, milkshakes, etc.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently.

The various illustrative logical blocks, modular dispensers, routines, and algorithm steps described in connection with the embodiments disclosed herein can be implemented as electronic hardware, computer software, or combinations of both. To clearly illustrate this interchangeability of hardware and software, various illustrative components, blocks, modular dispensers, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modular dispensers described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

While the above detailed description has shown, described, and pointed out novel features as applied to various embodiments, it can be understood that various omissions, substitutions, and changes in the form and details of the devices or algorithms illustrated can be made without departing from the spirit of the disclosure. For example, although different numbers have been used for similar components or features in different figures (e.g., different numbers have been used for the dispenser modules, displays, controllers, etc.), the structural and functional features described in connection with one figure, embodiment, or numbered element may be incorporated into the different-numbered components or features, and vice-versa. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

The following is claimed:

1. A dispensing system comprising:
   a controller; and
   a plurality of modular dispensers configured to removably interface with the controller, each of the plurality of modular dispensers comprises:
      a housing,
      a pump positioned in the housing,
      a user input device on the housing configured to control one or more functions of only a corresponding modular dispenser of the plurality of modular dispensers, and
      a spout for dispensing an ingredient into a vessel placed underneath the spout, wherein the spout extends from the housing,
   wherein the controller is configured to communicate instructions to at least one of the plurality of modular dispensers to dispense ingredient, and
   wherein at least a first modular dispenser of the plurality of modular dispensers is removable from the dispensing system during operation of a second modular dispenser of the plurality of modular dispensers.

2. The dispensing system of claim 1, wherein the user input device enables a user to select an ingredient stored in each of the plurality of modular dispensers.

3. The dispensing system of claim 2, wherein the controller is configured to receive instructions from a network interface for each of the plurality of modular dispensers based on the selected ingredient.

4. The dispensing system of claim 3, wherein the instructions received from the network interface include a pump characteristic for dispensing the selected ingredient from each of the plurality of modular dispensers.

5. The dispensing system of any one of claim 1, wherein the user input device enables a user to adjust a quantity of the ingredient to be dispensed.

6. The dispensing system of claim 5, wherein upon actuation of the user input device, the at least one of the plurality of modular dispensers dispenses the ingredient.

7. The dispensing system of claim 6, wherein each actuation of the user input device is configured to dispense a single pump of the ingredient from the at least one of the plurality of modular dispensers.

8. The dispensing system of claim 6, wherein each actuation of the user input device is configured to dispense multiple pumps of the ingredient from the at least one of the plurality of modular dispensers.

9. The dispensing system of claim 1, wherein the user input comprises one of the following: a switch, a knob, a wheel, a slide key, a capacitive touch sensor, and a microphone.

10. A dispensing system comprising:
a controller; and
a plurality of modular dispensers configured to removably interface with the controller, each of the plurality of modular dispenser comprises a user input device and a spout, each of the plurality of modular dispensers is configured to store a beverage ingredient,
wherein based on an input to the user input device of one of the plurality of modular dispensers, the controller is configured to communicate instructions to said one of the plurality of modular dispensers to transition between a beverage mode and a cleaning mode,
wherein in the beverage mode, a first pump characteristic of said one of the plurality of modular dispensers is set to pump the beverage ingredient stored in said one of the plurality of modular dispensers through a supply line associated with said one of the plurality of modular dispensers,
wherein in the cleaning mode, a second pump characteristic of said one of the plurality of modular dispensers is set to pump a cleaning fluid through the supply line instead of the ingredient,
wherein the first pump characteristic is different from the second pump characteristic.

11. The dispensing system of claim 10, wherein the controller is configured to communicate instructions including a third pump characteristic to a second modular dispenser of the plurality of modular dispensers.

12. The dispensing system of claim 10, wherein the user input comprises one of the following: a switch, a knob, a wheel, a slide key, a capacitive touch sensor, and a microphone.

13. The dispensing system of claim 10, wherein the cleaning mode causes said one of the plurality of modular dispensers to dispense a cleaning fluid stored in said one of the plurality of modular dispensers.

14. The dispensing system of claim 10, wherein the pump characteristics comprises a pump speed.

15. The dispensing system of claim 10, wherein the pump characteristics comprises a time of dispensing.

16. The dispensing system of claim 10, wherein the pump characteristics comprises a volume to be dispensed.

17. The dispensing system of claim 10, wherein the pump characteristics comprises an algorithm for dispensing.

18. The dispensing system of claim 1, wherein each modular dispenser further comprises a pump frame, wherein the pump is attached to a rear of the pump frame.

19. A method of replacing a first modular dispenser in a dispensing system comprising a plurality of modular dispensers interfaced with a controller of the dispensing system, the first modular dispenser comprising a first housing, a first pump positioned in the first housing, a first user input device on the first housing, and a first spout for dispensing an ingredient into a vessel placed underneath the first spout, wherein the first spout extends from the first housing, the method comprising:
decoupling an interface between the first modular dispenser and the controller;
removing the first modular dispenser from the dispensing system by:
removing the first housing from the dispensing system with the first pump positioned in the first housing, the first user input device on the first housing, and the first spout extending from the first housing, so the entire first modular dispenser is removed from the dispensing system;
adding a second modular dispenser to the dispensing system in place of the first modular dispenser; and
communicatively interfacing the second modular dispenser and the controller,
wherein the second modular dispenser comprises:
a second housing;
a second pump positioned in the second housing,
a second user input device on the second housing; and
a second spout for dispensing an ingredient into a vessel placed underneath
the second spout, wherein the second spout extends from the second housing.

20. The method of claim 19, further comprising removing the first modular dispenser from the dispensing system without disrupting operation of remaining ones of the plurality of modular dispensers.

* * * * *